(12) United States Patent
Kaell et al.

(10) Patent No.: US 7,445,093 B2
(45) Date of Patent: Nov. 4, 2008

(54) DISC BRAKE AND DISC STABILIZING ELEMENTS

(75) Inventors: Patrik Kaell, Helsingborg (SE); Goeran Stensson, Broesarp (SE); Joakim Gripemark, Helsingborg (SE)

(73) Assignee: Haldex Brake Products AB (SE)

( * ) Notice: Subject to any disclaimer, the term of this patent is extended or adjusted under 35 U.S.C. 154(b) by 348 days.

(21) Appl. No.: 11/172,247

(22) Filed: Jun. 30, 2005

(65) Prior Publication Data

US 2006/0027428 A1 Feb. 9, 2006

(30) Foreign Application Priority Data

Jul. 1, 2004 (SE) .................................... 0401704

(51) Int. Cl.
 *F16D 55/00* (2006.01)
(52) U.S. Cl. .................................. 188/72.3; 188/73.32
(58) Field of Classification Search .................. 188/17, 188/18 A, 73.31–73.39, 205 A, 72.3; 192/30 V, 192/207, 209, 212, 70.17, 70.28
 See application file for complete search history.

(56) References Cited

U.S. PATENT DOCUMENTS

| 3,157,057 A | * | 11/1964 | Palmer et al. .................. 74/378 |
| 3,245,508 A | * | 4/1966 | Livezey ................... 192/107 R |
| 3,952,842 A | * | 4/1976 | Klaue ......................... 188/71.4 |
| 5,437,351 A | * | 8/1995 | Lindner ..................... 188/18 A |
| 6,705,437 B2 | * | 3/2004 | Severinsson et al. ..... 188/73.32 |
| 2003/0006104 A1 | | 1/2003 | Baumgartner et al. ......... 188/17 |
| 2003/0127290 A1 | * | 7/2003 | Severinsson et al. ..... 188/73.32 |
| 2004/0069575 A1 | * | 4/2004 | Mura et al. ................ 188/18 A |

FOREIGN PATENT DOCUMENTS

| DE | 197 38 881 A1 | 3/1999 |
| DE | 101 59 799 A1 | 6/2003 |
| EP | 1 004 788 A2 | 5/2000 |
| EP | 1 211 433 A2 | 6/2002 |

OTHER PUBLICATIONS

International Search Report, Nov. 10, 2005 (4 pages).
Written Opinion of the International Searching Authority, Nov. 10, 2005 (6 pages).

* cited by examiner

*Primary Examiner*—Christopher P Schwartz
(74) *Attorney, Agent, or Firm*—St. Onge Steward Johnston & Reens LLC

(57) ABSTRACT

The present invention refers to a disc brake and to disc brake stabilizing elements to be used in such disc brakes. The disc brake comprises a caliper receiving one or more brake pads and encircling one or more brake discs, of which at least one brake disc is received slideably on a hub or a part connected to the hub, by means of splines or teeth, wherein two or more disc stabilizing elements are placed between each brake disc and the hub or the part connected to the hub and which are configured and arranged such as to deflect in axial direction during application of the brake and create forces assisting the axial retraction of the brake discs at release of the brake.

36 Claims, 28 Drawing Sheets

A-A

B-B

DISC BRAKE AND DISC STABILIZING ELEMENTS

This application claims priority of Swedish Patent Application No. 0401704-2 filed on Jul. 1, 2004.

FIELD OF THE INVENTION

The present invention concerns disc brakes and disc stabilizing element to be used in such disc brakes. Disc brakes normally either have a fixed caliper or a sliding caliper. The present invention is directed to disc brakes having a fixed or sliding caliper and one or more brake discs, of which at least one is sliding. The present invention concerns both disc brakes in which the brake pads only are to act on a restricted part of a full circle, and also disc brakes in which the brake pads act on almost a full circle along the brake discs. The former type of brakes is also referred to as spot-type disc brakes.

PRIOR ART

Sliding brake discs are normally received on a sleeve, hub or the like by means of teeth, splines or the like, or by any other means giving a fixed connection in rotational direction but a sliding connection in axial direction. The hub, sleeve etc. is received on and connected to the wheel axle. Depending on type and make of the brake the brake disc may either be received on a sleeve on or otherwise connected to the hub, connected to the wheel axle, or the brake disc may be received directly on the hub, without the use of any sleeve. For convenience the expression "hub" is normally used in this description, but it should be construed broadly also covering sleeves etc. In order to allow for sliding there generally has to be a certain play between the teeth, splines or the like on the inner circumference of the brake disc and the teeth, splines or the like on the outer circumference of the hub or sleeve.

A brake having one or more sliding discs may encounter problems both in a released condition and in connection with application and releasing of the brake. In the released condition there may be noise problems, problems with skewing and/or the possibility of dragging. In connection with release and application of the brake there may be problems regarding a proper separation of brake pads and discs.

Due to the play needed between disc and hub to make relative movement possible it is inherent that there may be noise in a released condition. The noise may be created in that the wheel axle and thus the hub rotate and the brake discs are received "loosely" on the hub, whereby the noise is formed by movements of the disc in relation to the hub. This problem is often solved in that springs or the like are placed to provide radial forces to the disc. Noise may also be formed due to the travel on uneven ground causing a jerk or jerks through the vehicle.

If the discs skew, there is a risk that they lock in skewed positions in released condition. Without proper separation of the brake discs and brake pads after braking there may be excessive wear of the brake pads and dragging may occur, i.e. the brake disc or discs remain in contact with the brake pads in a released condition.

Even if some aspects of the noise problems may be solved by the prior art, noise created by driving on uneven roads is not always lessened enough by means of the devices of the prior art.

Beside noise generation other problems in brakes do consist in the heat generation. During braking, the discs are heated up immensely. The heat generated by the braking process is conducted to the hub and thereby also to the bearings arranged in the hub, whereby most of the heat is conducted to the bearings when the brake is in its released condition, which, of course, is the case during most of the time, when the brake is in use. The bearings itself as well as the lubricating means used by the bearings are highly sensitive to heat. Therefore, heat, which is present over a certain temperature level for a long time, will substantially shorten the lifetime of the bearings in the hub. Their replacement will significantly increase the service costs.

The heat conduction mainly takes place via the splined connection between the discs and the hub or the part connected to the hub. The larger the number of contact points between the splines or the teeth of the brake disc and the hub or the part connected to the hub on the one hand, or the smaller the air gap, i.e. clearance, between the surfaces of the splines or the teeth on the other hand, the more heat will be conducted to the bearings. In addition, if said clearance of the splined connection varies considerably due to improper translational or rotational centering of the brake disc in relation to the hub or the part connected to the hub, more heat is conducted to the bearings as well.

In other words, the magnitude of the air gap or clearance in the splined connection is crucial for the reduction of the heat conduction from the brake disc to the hub or the part connected to the hub.

SUMMARY OF THE INVENTION

The present invention addresses all of the afore-mentioned problems, which occur in disc brakes.

In addition to the noise and heat problem other aspects of the conditions at braking are handled by the present invention, such as retraction of the brake discs at release of the brake and problems regarding skewing and dragging.

In order to avoid noise and dragging it is desirable to stabilize the disc, i.e. to avoid disc inclination. Springs or other disc stabilizing elements having a friction effect may be placed between the hub or sleeve and the disc to get the desired disc stabilisation. The disc stabilizing elements are pressed against the hub, creating contact forces in a mainly radial direction. The forces in the radial direction keep the centres of the discs and hub in generally the same position (i.e. along a common axis). If and when the disc is urged to deviate from its normal position perpendicular to the rotational axis of the hub friction forces in an axial and/or tangential direction will be created. The friction forces are large enough to create this desired stabilisation of the disc but not so large that they produce any considerable resistance to the axial sliding of the disc at application or release of the brake, which would result in the possible interference with brake operation and/or compensation for asymmetric wear of the brake pads. Normally parts of the springs or other disc stabilizing elements are placed in gaps between splines or teeth of the hub and disc, respectively. Thus, the friction is formed in contact surfaces between the springs and the splines or teeth.

When the brake is applied and the disc is clamped between the braking pads, the disc will be aligned and kept perpendicular to the rotational axis of the hub. When the brake is released, elastic forces in caliper, pads and disc will give the disc a slight axial movement mainly without any tendency of inclination for the disc. Consequently, the disc is still in its normal non-inclined position immediately after a brake release. The friction forces created by the action of the disc stabilizing elements as mentioned above will then maintain this non-inclined position. If, for some reason the disc becomes inclined it will rapidly return to a non-inclined position by the interaction of the friction forces and contact forces from the pads, and then be maintained there. Without these friction forces the disc may stay in an inclined position and find an equilibrium state with pad forces and axial friction forces in the splined contact balancing each other. This may produce dragging torque as well as additional noise.

Disc stabilisation may also be achieved utilising tangential forces from the springs or other disc stabilizing elements. Tangential forces will try to rotate the disc and stabilize it by bringing the teeth or splines on the disc and the hub into contact and by that align the disc to the hub. Furthermore, by means of the springs or other disc stabilizing elements possible manufacturing tolerances are taken up.

Another advantage of the disc stabilisation achieved by such disc stabilizing elements, especially when they are equidistantly spaced over the circumference of the brake disc and/or hub or the part connected to the hub, consists in the fact that they are able to keep an even distribution of the clearance between the brake disc and the hub, which will lead to equal air gaps or distances between the faces of the splines or teeth of the brake disc and the faces of the splines or teeth of the hub at their both sides, respectively, thereby avoiding points of contact by which thermal conductivity can take place.

Such even distribution is achieved in that the disc stabilizing elements are arranged in such a way so as to translationally or rotationally center the brake disc against the hub, when the brake is in the released condition. More advantageously, the disc stabilizing elements are configured so as to center the brake disc against the hub or the part connected to the hub both translationally and rotationally. The number of elements for each or both functions may be one or more per brake disc.

The disc stabilizing elements may be designed in different ways. In one preferred embodiment each disc stabilizing element is a spring made of one wire. The spring has a generally rectangular form in plan view. A loop is formed in each long side of the rectangular spring, approximately in the middle of each side.

In another embodiment the spring is made in one piece, e.g. by punching of a metal sheet. Also here the spring has a generally rectangular form in plan view. Instead of loops the spring of this embodiment has curved parts on each long side adjacent each short side of the spring.

Still in another embodiment the disc stabilizing element is made of spring wire which is formed in such a way so as to comprise two lower free ends and one upper bent end, preferably on one side of the brake disc, whereas the free ends do engage with a top of two adjacent splines or teeth of the brake disc and whereas the wire is extending from one free end axially over the width of the brake disc and the hub to the other side of the brake disc and back again to the other free end.

A disc stabilizing element according to another embodiment of the invention is made of a single spring wire, which is formed to a helical spring which is to be received in a gap of the splines or teeth of the brake disc. At both ends of the helical spring, the spring wire is extending in opposite directions, namely radially to the brake disc. Both ends terminate in brackets, which preferably do face each other in such a way so as to clamp a spline or tooth, which follows the gap, respectively.

Also using punched metal sheet, in another embodiment, a disc stabilizing element is configured substantially as a U-shaped double wall element, which embeds a spline or tooth of the brake disc or the hub.

The number of disc stabilizing elements may vary and preferably should be at least two and more preferably at least three per disc.

Different types of disc stabilizing elements can be arranged between the brake disc and the hub or the part connected to the hub. Also, for brakes having two or more brake discs, different types of disc stabilizing elements can be arranged with regard to different brake discs.

The disc stabilizing elements assist in the axial movement of the disc at release of the brake. At application of the brake the disc stabilizing elements will deflect elastically in an axial direction when the disc slides, which will provide an axial force on the disc striving to move it backwards again at release of the brake.

The disc stabilizing elements have effect in rotational, axial as well as tangential direction.

Disc brakes normally have means to compensate for the wear of the brake lining material, i.e. the axial positions of the brake pads and brake discs are adjusted depending on said wear. Such wear compensation may either be single-sided or double-sided. The present invention functions with both these types of wear compensation. Thus, the disc stabilizing elements or springs of the present invention participates in the wear compensation of a disc brake having a single-sided adjustment means by sliding axially as the pads are worn. This sliding capacity of the disc stabilizing elements or springs is important also for brakes having double-sided wear compensation, and especially at asymmetric wear of the brake pads (i.e. the brake pad on one side of the disc wearing faster than the brake pad on the other side of the disc). To provide for pad wear compensation the disc stabilizing elements are configured so as to axially frictionally engage the hub or the part connected to the hub in such a way that the disc stabilizing elements deflect in axial direction but remain axially stationary on the hub or the part connected to the hub when axial forces insufficient to overcome the axial frictional engagement between the disc stabilizing elements and the hub or the part connected to the hub are applied, and that the disc stabilizing elements deflect in axial direction and also slide axially on the hub or the part connected to the hub when axial forces sufficient to overcome the frictional engagement between the disc stabilizing elements and the hub or the part connected to the hub are applied.

One object of the present invention is to give proper separation between brake discs and brake pads, including proper behaviour at start and end of braking.

Another object is to reduce the risk of skewing or inclination and the risk of dragging. A further object is to reduce noise or rattle in the brake irrespectively of origin. Thus, to stabilize the brake discs.

Still another object of the present invention is to substantially reduce the effects to thermal conductivity on the bearings and thereby prolong their lifetimes.

Yet a further object of the present invention is that as few different parts as possible should be needed to form the disc brake. By having identical discs, disc stabilizing elements etc. assembly, storing etc. are made easier.

Still another object of the present invention is to allow for wear of the brake pads to be compensated for by allowing for permanent axial movement of the disc on the hub when desired.

These objects are solved by a disc brake according to claim 1 and by disc stabilizing elements according to claims 35, 40, 43 and 44.

The present invention is used for a disc brake having a caliper receiving one or more brake pads and encircling one or more brake discs. At least one brake disc may be received slideably by means of splines or teeth on a hub or a part connected to the hub. The hub is received on a wheel axle. The one or more brake pads are parts of brake pad assemblies.

According to the invention, disc stabilizing elements are placed between each disc and the hub or the part connected to the hub. During application of the brake the disc stabilizing elements deflect in axial direction and create forces assisting the axial retraction of the brake discs at release of the brake.

Furthermore the present invention facilitates manufacture of brake discs and hubs etc., as the demands on close tolerances in the splines (teeth) are less severe compared to systems not utilising the present invention. Thus, there may be a simplified and yet effective manufacture of disc and hub.

Further objects and advantages of the present invention will be obvious for a person skilled in the art when reading the detailed description below of preferred embodiments.

BRIEF DESCRIPTION OF THE DRAWINGS

The invention will be explained further below by way of an example and with reference to the enclosed drawings. In the drawings:

FIG. 23a is a sectional view along A-A in FIG. 21a and FIG. 23b is a sectional view along B-B in FIG. 21a;

DETAILED DESCRIPTION OF PREFERRED EMBODIMENTS

As used in this description the expressions "axial", "radial", "tangential" and similar expressions are in relation to a wheel axle (not shown) associated with the brake and to the brake discs, hub or sleeve etc. received directly or by means of intermediate parts on the wheel axle.

Figure 1:
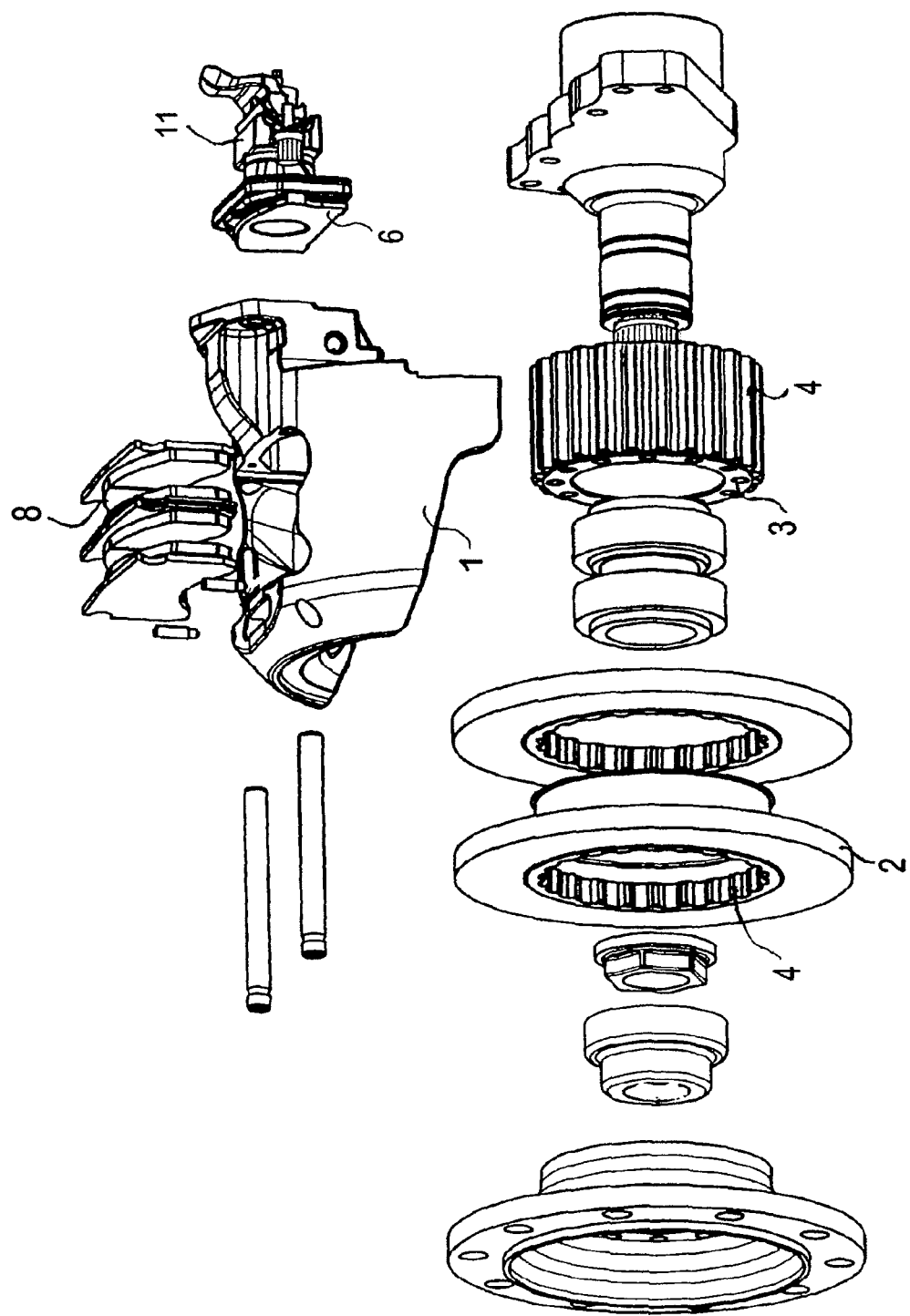
FIG. 1 is an exploded view of one general example of a disc brake.

The expressions "outer" and "inner" are used to describe the placement of components, or parts of components, as seen in an axial direction from the centre of the vehicle, "outer" means a placement more far from the vehicle centre-line to the side of the vehicle. As seen in FIG. 1 "inner" is to the right and "outer" is to the left.

In FIG. 1 one general example of a disc brake is shown. A person skilled in the art realizes that the principles of the present invention apply for disc brakes having many different structures. Only parts important for the understanding of the present invention will be specifically referred to in the description below.

The disc brake as shown has a caliper 1 surrounding two brake discs 2 received on a hub 3. The brake discs 2 have splines 4 on an inner circumference, which splines 4 are to mesh with splines 4 on the outer circumference of the hub 3. Brake pads 8 are received slidable in the caliper 1 in a normal way. The brake pads 8 are applied by means of a thrust plate 6 and a brake mechanism 11, received in the caliper 1. Braking torque is transferred from the discs 2 to the hub 3, and thus the wheel, by means of the splines 4 or teeth of the brake discs 2 and hub 3, respectively.

By means of the splines 4 the discs 2 are received giving a fixed connection in rotational direction but a sliding connection in axial direction. In other embodiments (not shown)

other numbers of discs 2 are used and one disc 2 may be fixed in axial direction. Brake pads 8 are placed on both sides of each brake discs 2. Also the brake pads 8 are received moveable in axial direction in the caliper 1, even though the outermost brake pad 8, i.e. the one furthest from the thrust plate 6, may be fixed. During braking the brake mechanism 11 will press the thrust plate 6 against the adjacent brake pad 8, which will be pressed against the brake disc 2 and so on. Braking will occur as the brake pads 8 and brake discs 2 are pressed against each other.

When the brake is released there should be a distance between each brake disc 2 and adjacent brake pads 8. In order for the discs 2 to be able to move axially there must be a play in the splines contacting between the discs 2 and the hub 3.

Figure 2:
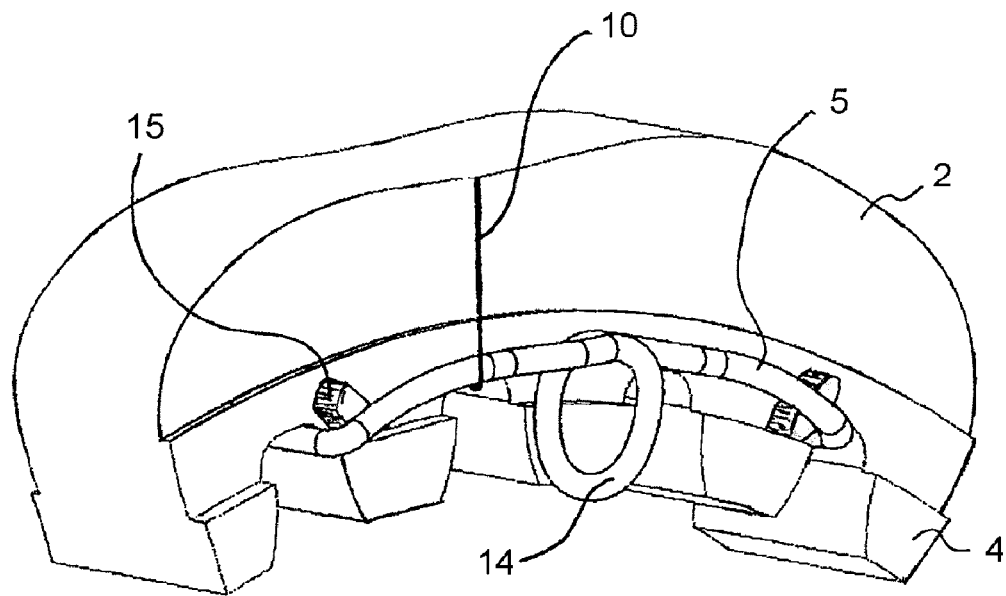
FIG. 2 is a principal sketch illustrating a disc stabilizing element mounted at a brake disc according to the present invention.
Figure 4:
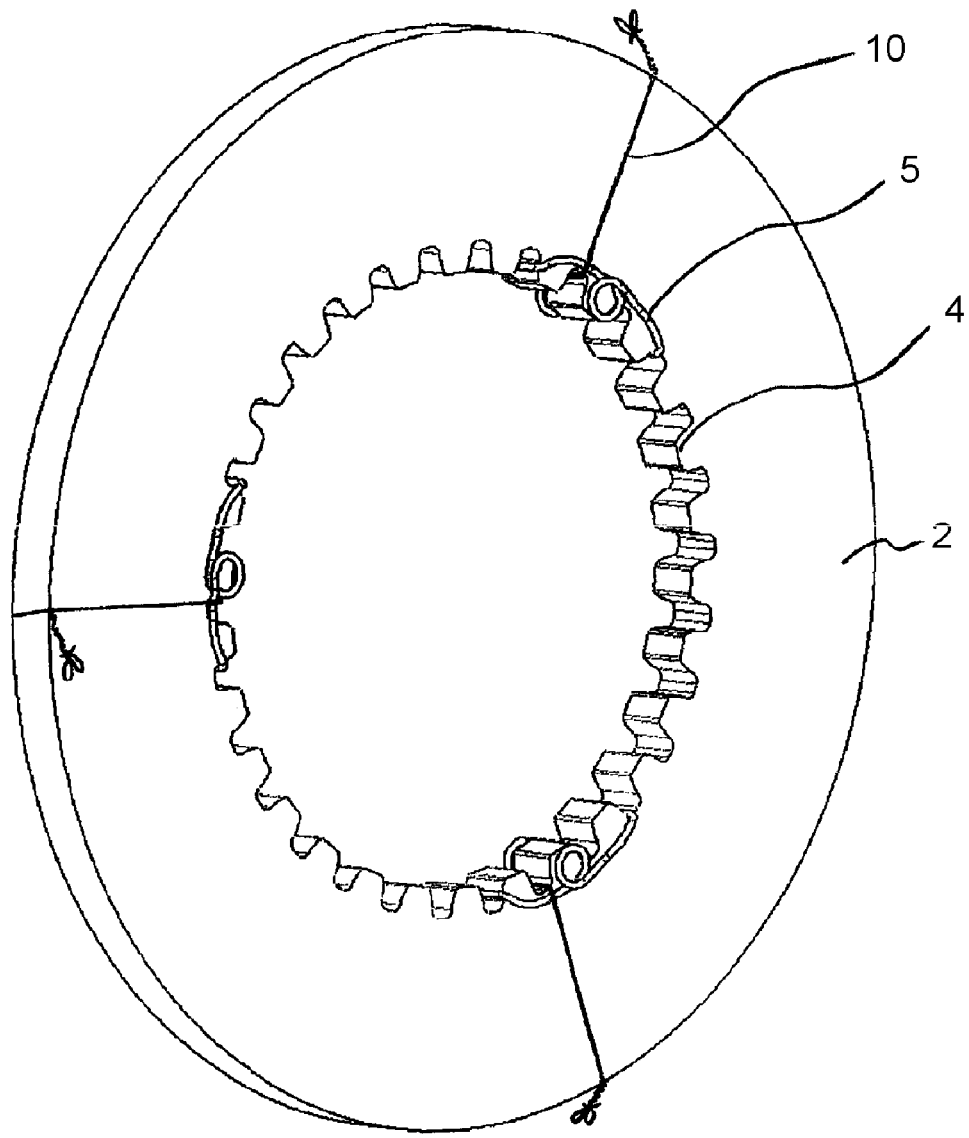
FIG. 4 is a perspective view illustrating the mounting of the disc stabilizing elements of previous FIGS. 2 and 3 on a brake disc and before assembly of the disc to a brake.
Figure 16:
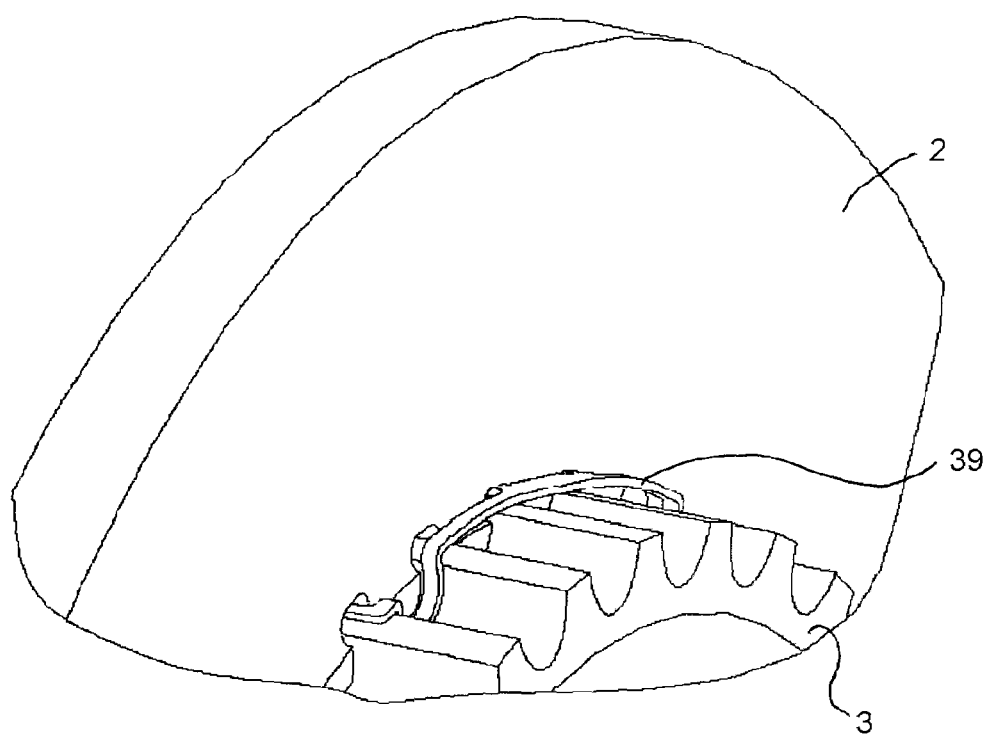
FIG. 16 is a principal sketch of yet an example of a disc stabilizing element according to the present invention and mounted at a brake disc.
Figure 17:
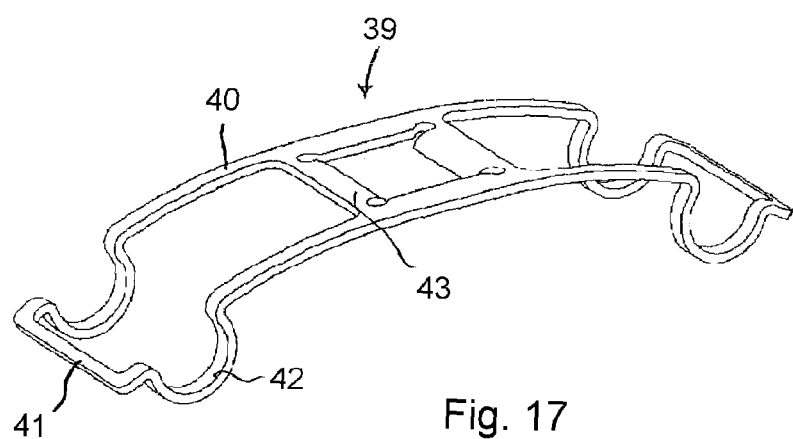
FIG. 17 is a perspective view of the disc stabilizing element of FIG. 16.
Figure 24:
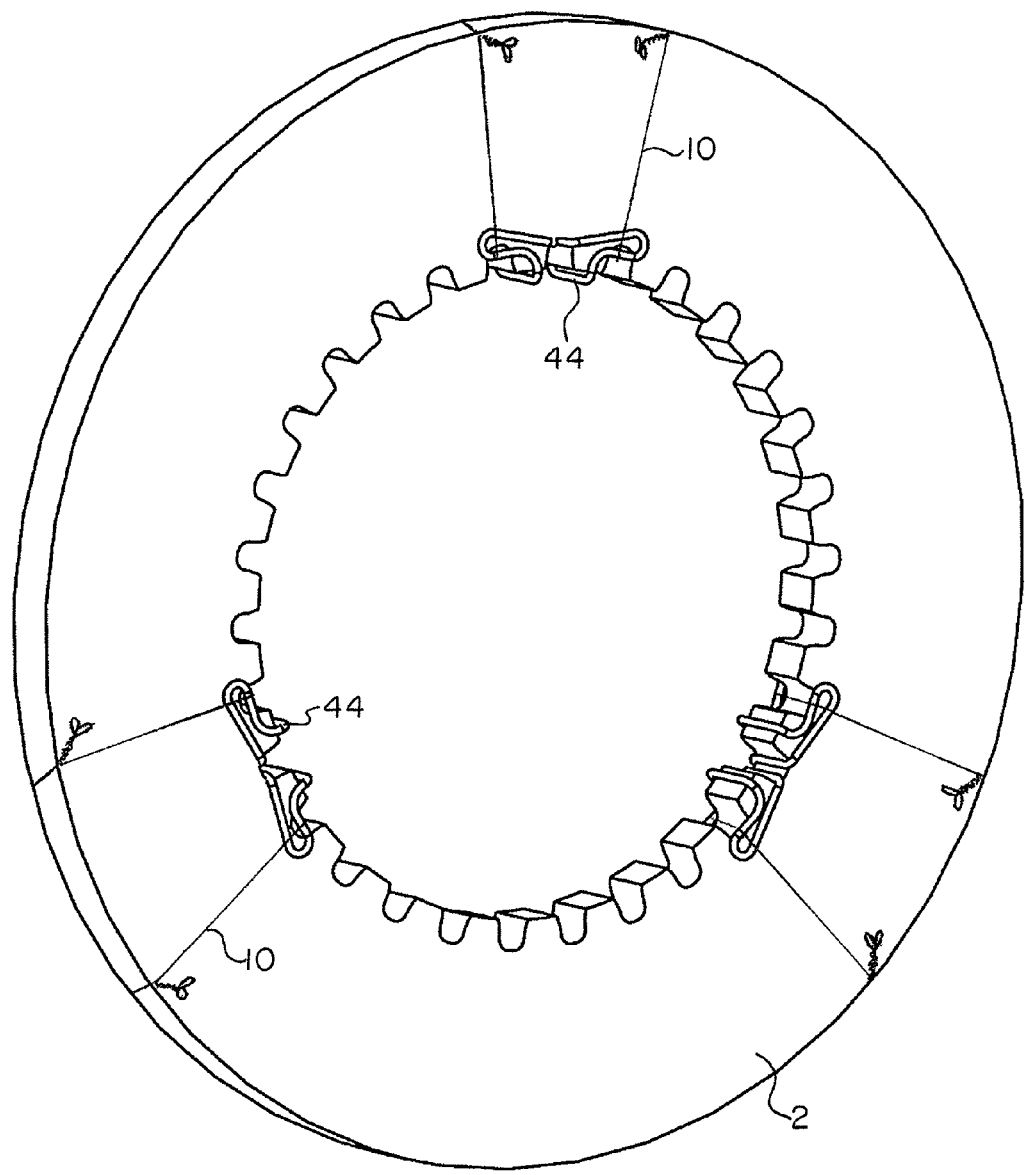
FIG. 24 is a perspective view illustrating the mounting of the disc stabilizing elements of FIGS. 20-23b on a brake disc and before the assembly of the disc to a brake.

According to the present invention a number of disc stabilizing elements (not shown in FIG. 1) are placed between each brake disc 2, 30, 33, 34 and the hub 3, 31 or the like. In some of the shown embodiments the disc stabilizing elements are springs 5, 20, 25, 36, 44, 56 made of a single spring wire and bent in a suitable way. Normally, the free ends of the spring wire are fixed to each other. In other embodiments the free ends are placed adjacent each other without being fixed to each other. In the embodiment of FIGS. 16 and 17 the spring 39 is made by punching of a metal plate. A person skilled in the art realizes that the disc stabilizing elements or springs may be produced in many different ways, e.g. also by casting or molding. During assembly of the brake disc 2 to the brake the springs 5, 39, 44, 56 may be held at the brake disc 2 by means of lashing wires or tie wires 10, as indicated in FIGS. 2, 4 and 24. This also applies for the springs of FIGS. 16 and 17, FIGS. 18 and 20 and FIG. 31. The lashing wires 10 are to be removed after assembly and before the brake is used. The springs 5, 39, 44, 56 do not necessarily hold by themselves on the disc 2, thus, without the lashing wires 10 the springs 5, 39, 44, 56 may be allowed to fall off of the disc 2.

Figure 3:
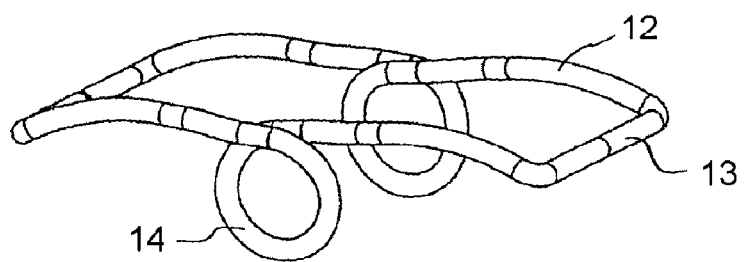
FIG. 3 is a perspective view of the disc stabilizing element of FIG. 2.

In the embodiment shown in FIG. 3 the spring 5 has an approximately rectangular shape seen in plan view with two long sides 12 and two short sides 13. A loop 14 is formed approximately in the middle of each long side 12. Each short side 13 of the springs 5 is to be placed in a gap of the splines or teeth of the brake disc 2. The loops 14 of the springs 5 are placed adjacent a tooth of the disc 2 and are received in gaps of the splines or teeth of the hub 3 at assembly. Furthermore, each spring 5 may be supported in axial direction by a support, or boss 15 integrated with the brake disc 2. A person skilled in the art realizes that the supports 15 may also be separate parts fixed in any suitable way to the disc 2. Said supports 15 position the springs 5 axially on the disc 2 and assist in moving the springs 5 with the disc 2 in axial direction. The supports 15 are placed adjacent the gaps where the short sides 13 of each spring 5 are received. Thus, after assembly the springs 5 are placed with the corners between the long and short sides 12, 13 of each spring 5 at the supports 15. In other embodiments the supports 15 are placed at other locations along the long sides 12 of each spring 5.

The number of springs 5 between each pair of disc 2 and hub 3 may vary. For example in the embodiment of FIG. 4 there are three springs 5 relatively evenly spread around the disc 2.

Figure 7A:
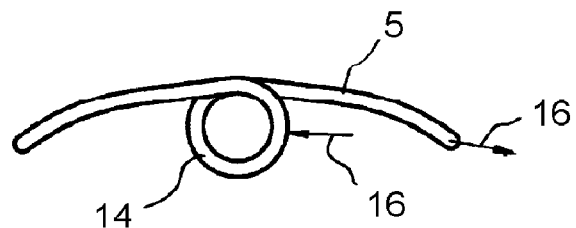
FIGS. 7a to 7c are perspective views of a disc stabilizing element according to the present invention and illustrating different directions of forces influencing the spring.
Figure 7B:
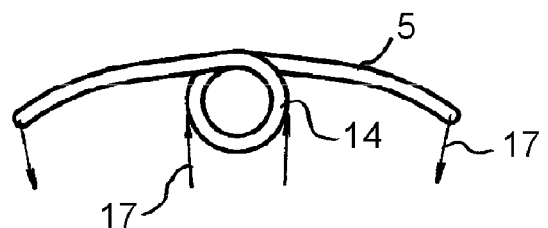
Figure 7C:
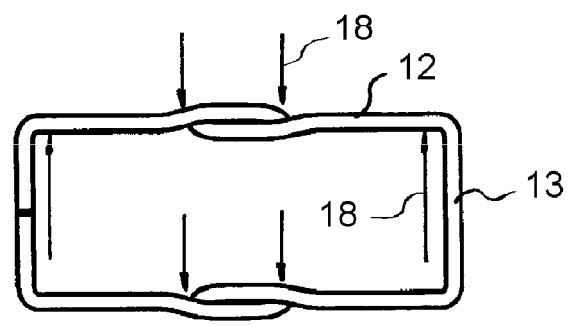

The purpose of the FIGS. 7a to 7c is to illustrate the different directions of the contact forces that may act on the spring 5, which directions are referred to in this description. Thus, in FIG. 7a tangential forces 16 are shown, i.e. forces having a tangential direction in relation to a brake disc 2 or a wheel axle (not shown). In the same way FIGS. 7b and 7c show radial forces 17 and axial forces 18, respectively. A person skilled in the art realizes that the direction of the actual forces acting on the spring 5 may vary, having a resultant that is not strictly tangential, radial or axial.

Figure 5:
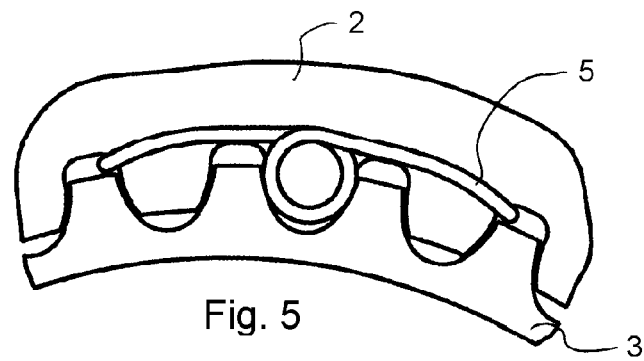
FIGS. 5 and 6 are a side view and perspective view, respectively, of a part of the disc brake illustrating the disc stabilizing element of FIG. 3 in its mounted condition being placed between a brake disc and a hub.
Figure 6:
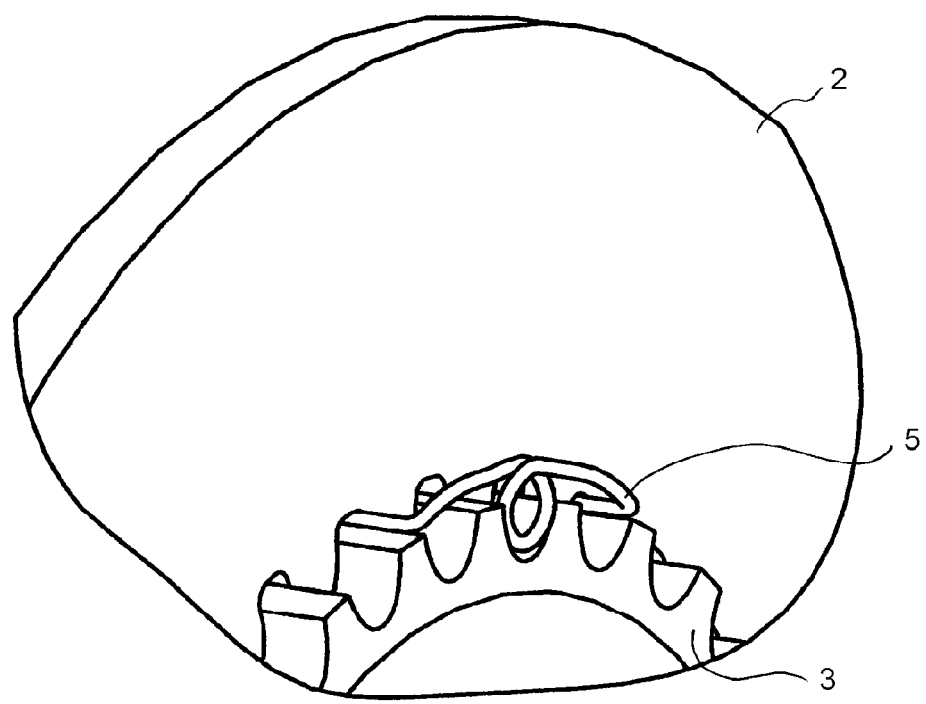

By means of the springs 5 being placed in between the hub 3 and the brake discs 2 radial forces directed outwardly are applied to each brake disc 2, due to elasticity and pretension of the springs 5. The radial forces assist in stabilizing the discs 2 in relation to the hub 3 and thus, reducing the risk of noise or rattle. Furthermore, the springs 5 give some degree of resistance against axial movement for the discs 2 in relation to the hub 3, and by that improve the stabilization of the discs 2 even more. This is due to the fact that the spring wire abuts the disc 2 and hub 3 in some locations. In the embodiment shown in FIGS. 5 and 6 the short sides 13 of the spring 5 are received in the teeth gaps of the disc 2, while the loops 14 are received in teeth gaps of the hub 3. In the contact surfaces between springs 5 and hub 3, friction forces are established when the discs 2 are moved in axial direction in relation to the hub 3. Said axial friction forces are established between the loops 14 of the springs 5 and the hub 3. The magnitude of the friction forces depends inter alia on the material and surface structures of the spring wires and hub 3, respectively. Furthermore, the size of the contact surfaces influences the magnitude of the established friction forces as well as the inclination of the contact surfaces between the spring wire and the disc 2 and hub 3, respectively.

The friction forces act in the opposite direction to the movement establishing said friction forces. By means of the friction forces and the form of the springs 5 a certain force will be needed to move the discs 2 in relation to the hub 3. The forces needed to move the discs 2 substantially reduce the risk of rattling in a released condition.

Figure 8:
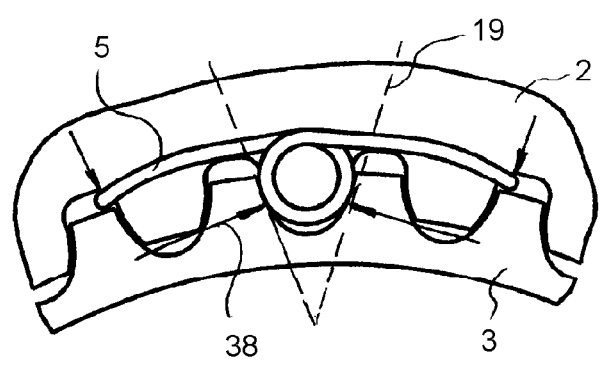
FIG. 8 is a side view corresponding to FIG. 5 and illustrating contact planes between a disc stabilizing element and a hub.

The loops 14 of the springs 5 abut two opposing sides of the splines 4 of the hub 3, enhancing the friction forces in axial direction by wedge action, compared to if there was only one contact surface or if there was no wedge angle. Thus, the design of the spring 5 with a loop 14 gives two contacts with the splines 4 of the hub 3. In FIG. 8 the tangent planes 19 of said contacts are indicated. At the contacts between the loop 14 of the spring 5 and the splines 4 of the hub 3 contact forces 38 are established between the spring 5 and the hub 3, giving axial friction forces.

Figure 9:
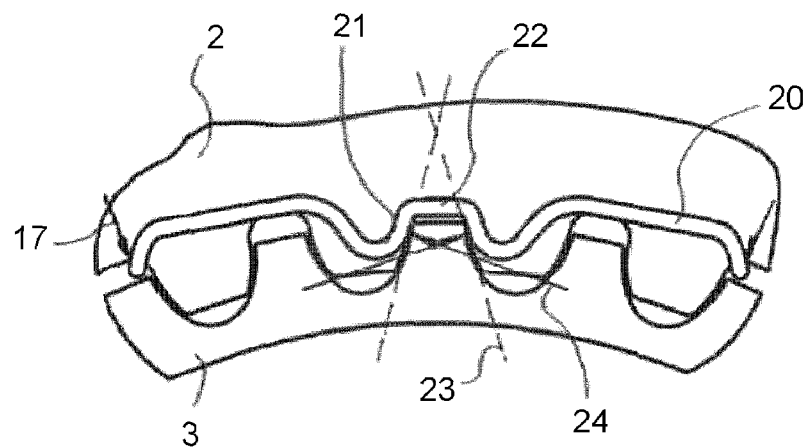
FIGS. 9 and 10 are a side view and perspective view, respectively, corresponding to FIGS. 5 and 6 showing an alternative disc stabilizing element.
Figure 10:
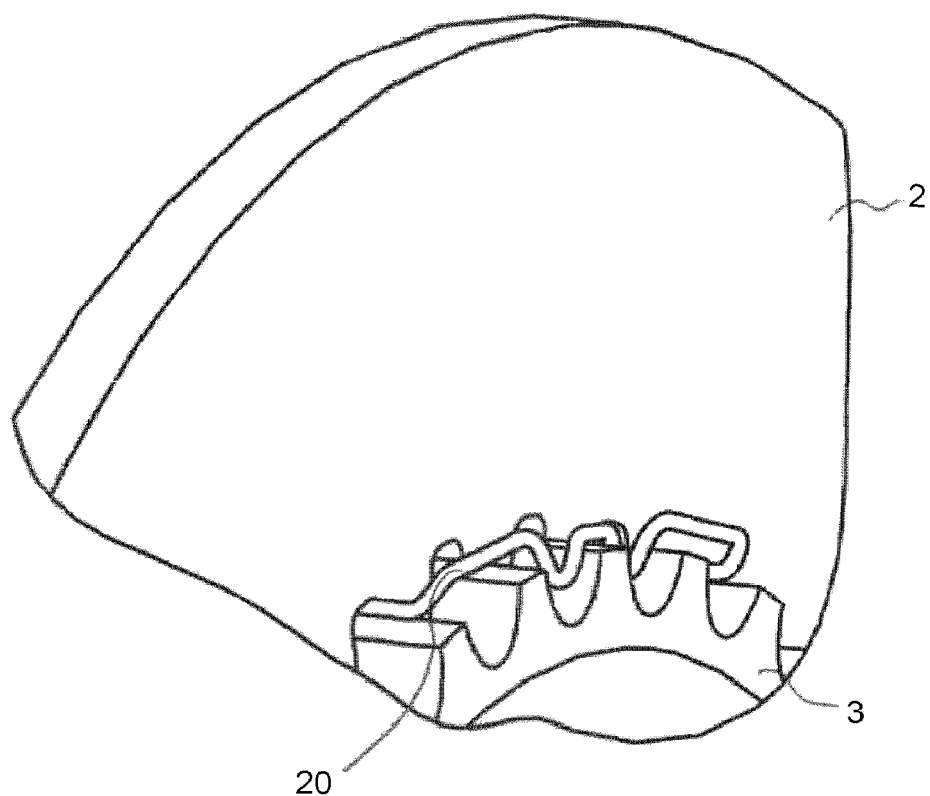

In the embodiment of FIGS. 9 and 10 the spring 20 has the same general rectangular shape as the previously described spring 5. However, instead of a loop at each long side this spring 20 has an alternative shape at the middle of each long side. At the centre of each long side there is a straight middle part 22 and adjacent said middle part 22 there is a bent part 21 on each side. The bend of the bent parts 21 is directed radially inwards. The bent parts 21 abut the tooth in contact with tangent planes 23, giving reaction forces 24. The contact tangent planes 23 are inclined giving a wedge-like effect.

Figure 11:
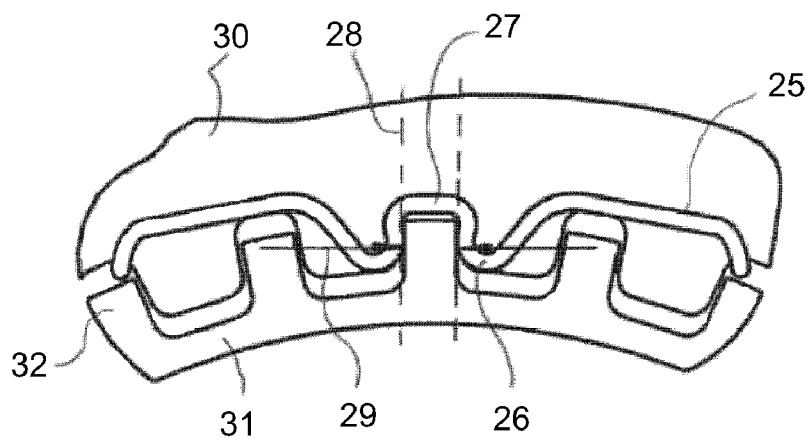
FIGS. 11 and 12 are a side view and perspective view, respectively, corresponding to FIGS. 5, 6, 9 and 10 of yet an alternative disc stabilizing element.
Figure 12:
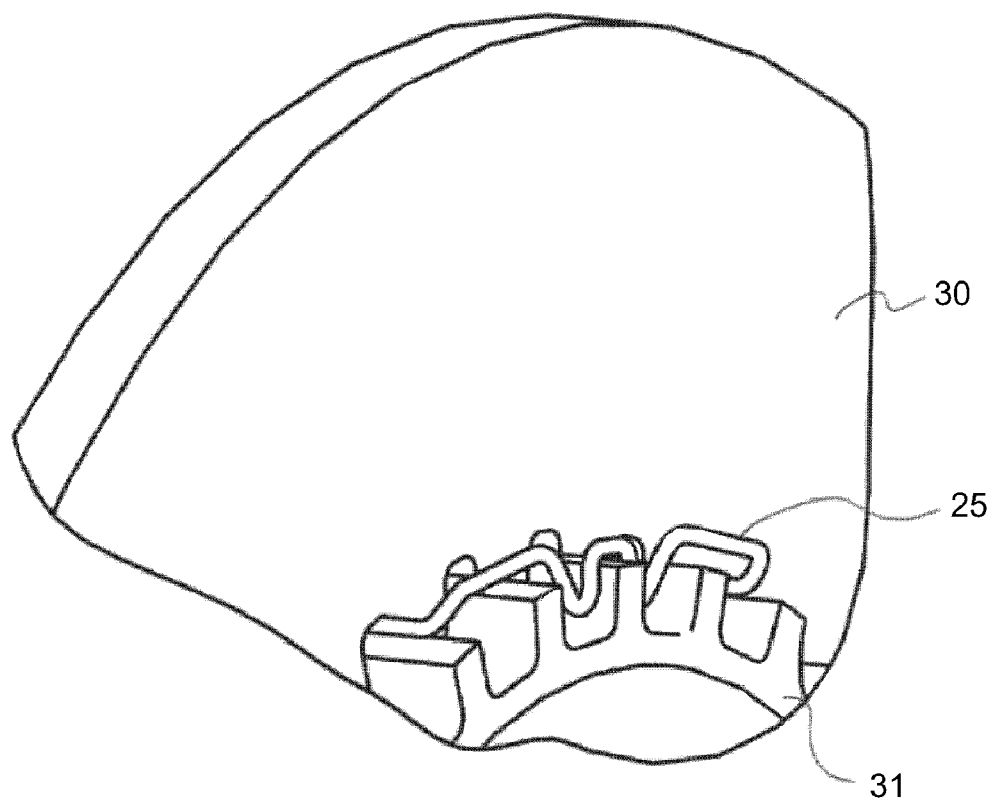

The embodiment of FIGS. 11 and 12 includes a spring 25 resembling the spring 20 of FIGS. 9 and 10. In this example the design of the splines or teeth of the brake disc 30 and the hub 31 is somewhat different. Thus, in this case the form of the tooth 32 of the hub 31 on which the spring 25 is clamped is relatively straight. The adaptation of the spring to the design of the teeth 32 of the hub 31 means in this case that there is an almost right angle between a middle part 27 and a bent part 26 on each side of the middle part 27. Reaction forces 29 are established in contacts with tangent planes 28 between the bent parts 26 of the spring 25 and the tooth 32 of the hub 31, as the spring 25 is clamped on the tooth. Reaction forces produced by clamping in this way may be utilized to add extra axial friction forces to the springs 20, 25 described above.

In one embodiment each spring will give no radial force, but friction forces. The friction forces established in co-operation with the hub are created mainly in that each spring will elastically clamp at least one spline 4 or tooth of the disc 2. The springs of FIGS. 11 and 12 may be designed to act in this way.

Also the spring 39 of the embodiment shown in FIGS. 16 and 17 has an approximately rectangular shape seen in plan view, with two long sides 40 and two short sides 41. Furthermore, the spring 39 has a general bent form following the form of the inner periphery of the disc 2 and the outer periphery of the hub 3, respectively. Each short side 41 of the spring 39 is to be placed in a gap of the splines or teeth of the brake disc 2, preferably without to make contact with either the disc 2 or the hub 3. Two curved parts 42 are formed on each long side 40 and adjacent each short side 41. In the middle of the spring 39 two cross bars 43 are formed extending between the long sides 40. By means of the cross bars 43 a radial force of the spring 39 will be transferred to the brake disc 2. Normally, one tooth or spline 4 of the brake disc 2 is placed inside an opening defined by the two cross bars 43 and the long sides 40. The tooth or splines 4 of the disc 2 is received loosely in said opening, which means that lashing wires 10 or the like are needed to hold the spring 39 at the brake disc 2 before assembly. The curved parts 42 have a semicircular form, adapted to the dimensions of the gap between the teeth or splines 4 of the hub 3. The curved parts 42 of the spring 39 are placed adjacent a tooth or splines 4 of the brake disc 2 and are received in gaps of the splines 4 or teeth of the hub 3 at assembly. The short sides 41 connect the long sides 40 and are stabilizing the spring 39, especially at axial deflection during application or release of the brake. A person skilled in the art realises that also in this embodiment supports or bosses may be integrated with the brake disc 2, even if this is not shown in FIG. 16. As explained above in connection with FIGS. 2 and 3, the purpose of the supports or bosses is to give support to the spring 39 in axial direction.

The interface or contact tangent plane 19, 23 between the springs 5 and 20 and the splines 4 or teeth of the hub 3 may be inclined, giving a wedge-like interface, as indicated in FIGS. 8 and 9. If the faces of the splines 4 or teeth are inclined the interface with the loops 14 of the springs 5 may automatically be wedge-like, as in FIG. 8. In the embodiment of FIG. 9 the spring 20 is given a wedge-like shape and the interface between the bent parts 21 of the spring 20 and the splines 4 or teeth may be wedge-shaped if the faces of the splines 4 or teeth are inclined. Whereby the contact between the bent parts 21 and the splines 4 or teeth may take place on the faces of said splines 4 or teeth. The wedge-shaped interface may also be given by the bent parts 21 of the spring 20 being such that the contacts with the splines 4 or teeth take place at the top corners of said splines 4 or teeth. In this latter case the wedge-shaped interface is established irrespectively of the shape of the faces of the splines 4 or teeth. Also in the embodiment of FIGS. 16 and 17 there will be a wedge-shaped interface between the spring 39 and the splines 4 or teeth of the hub 3. Also in the embodiments of FIGS. 18 and 20 the spring 44 can be designed such so as to provide wedge-shaped interfaces. The wedge-shaped interface magnifies the friction forces in the axial direction in the contact points between springs 5, 20, 39, 44 and hub 3 compared to interfaces having a tangentially directed contact plane on the top of a spline 4 or tooth of the hub 3. This is due to the fact that the sum of the contact forces on that spring 5, 20, 39, 44 is larger than the resultant radial force on the same spring 5, 20, 39, 44. In this way the required radial force produced by the spring 5, 20, 39, 44 may be reduced.

At release of the brake the discs 2, 30 should be retracted and properly separated from the brake pads 8. During braking the springs 5, 20, 25, 39, 44, 51, 54, 56 will be bent in the axial direction due to friction. The springs 5, 20, 25, 39, 44, 51, 54, 56 assist in the separation by flexing back in axial direction at release of the brake. The flexing back is due to the springs 5, 20, 25, 39, 44, 51, 54, 56 being bent at application of the brake and, thus, the flexing back is due to the fact that the springs 5, 20, 25, 39, 44, 51, 54, 56 strive to return to their original shape. As the springs 5, 20, 25, 39, 44, 51, 54, 56 assist and support the movements of the brake discs 2, 30 the performance of the brake is improved compared to brakes having no springs 5, 20, 25, 39, 44, 51, 54, 56 flexing in axial direction.

Figure 13A:
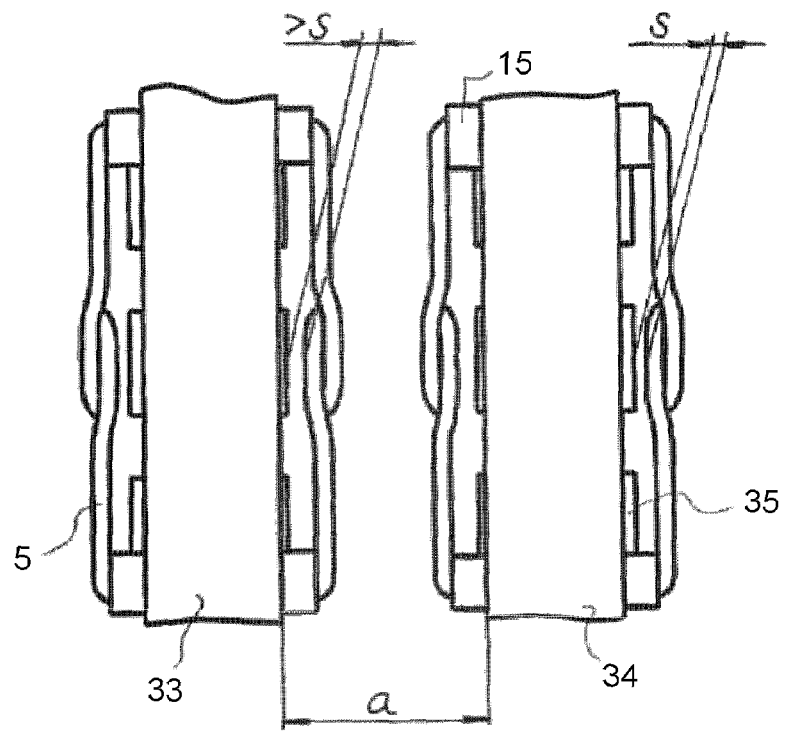
FIGS. 13a and 13b are plan views illustrating the movements of the discs and disc stabilizing elements in released and applied conditions, respectively.
Figure 13B:
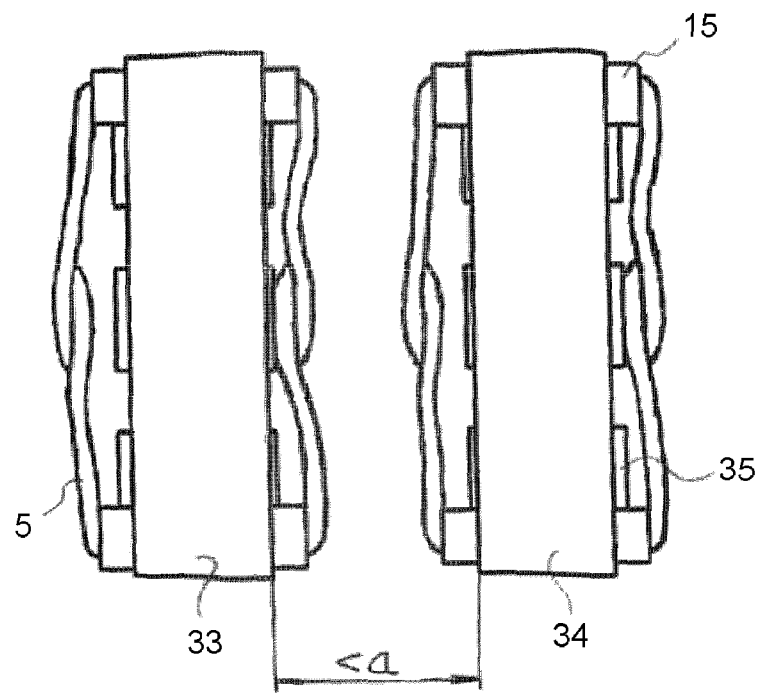

In FIGS. 13a and 13b one example of the situation of a released and applied brake, respectively, is indicated. In this example the brake disc 33 to the left is the inner brake disc, i.e. the brake disc closest to the brake mechanism. Thus, the other disc is the outer brake disc 34. As indicated the play s between the brake discs 33, 34 and each spring 5, and more precisely the loop 14 of the spring 5, on the outside of the discs 33, 34 differs between the inner disc 33 and the outer disc 34. The play s is smaller at the outer disc 34 than at the inner disc 33. When the brake is applied the disc 33, 34 will move to the right as shown in FIG. 13b. At the transition between the long 12 and short 13 sides of the spring 5, the spring 5 abuts the support 15. Thus, as the discs 33, 34 move at brake application the outer ends of the spring 5 will also move. However, the loop 14 of the spring 5 being in contact with the splines 4 of the hub 3 will initially be held by friction in the original position. Normally the middle part (loop 14) of the springs 5 will be held at the original position until being hit by the disc 33, 34.

As the pad and disc materials wear down each disc 33, 34 may attain slowly changing axial positions, in released as well as in applied position of the brake. This is also true in the case of asymmetric wear of the brake pads, in a brake with double-sided wear compensation. During this process the springs 5 will slide on the hub 3 and attain slowly changing axial positions, too. This is due to the fact that the springs 5 are following the discs 33, 34, not only at their ends, which are fixed axially to the disc 33, 34, but also at the middle, as indicated in FIGS. 13a and 13b. The sliding at the middle is either performed by the disc 33, 34 making contact with the middle part of the spring 5 and pushing it axially, or by the axial bending of each spring 5 growing large enough to overcome the friction forces between the spring 5 and the hub 3. In this way each spring 5 will produce an almost constant retraction travel of the disc 33, 34 at each release of the brake, independent of the wearing down state of discs 33, 34 and pads 8.

Normally, the brake discs 33, 34 will have to move different distances depending on their placement, as indicated in FIGS. 13a and 13b. In applied condition the distance a between the brake discs 33, 34 is reduced compared to the released condition. Thus, in this example the inner disc 33 will move somewhat farther than the outer disc 34. To accomplish this, the axial play between discs 33, 34 and the loops 14 of the springs 5 differ. Furthermore, at the loop 14 on the outer side of the disc 33, 34 the axial bending of each spring 5 may be limited by an axial contact with the disc 33, 34 that pushes the loop 14 to slide on the hub 3. For the loop 14 on the inner side of the disc 33, 34, the axial play will not affect the axial bending, as in this case the disc 33, 34 moves away from the loop 14 at application of the brake. This brings the spring 5 to produce a retraction of the disc 33, 34 at release of the brake that is a kind of average of the axial deflections of the spring parts on the outer and inner sides of the discs 33, 34, respectively. In this way the retraction distance of the disc 33, 34 may be controlled by arranging different axial play between the disc 33, 34 and the loop 14 on the outer side of the disc 33, 34. The largest play (>s) is at the inner most disc 33, while a smaller play (s) is arranged at the outer disc(s) 34. In some embodiments the splines 4 or teeth of the discs 33, 34 have different axial protrusions 35 on the outer and inner sides. Thus, by turning the discs 33, 34 the play on the outer side of the disc 33, 34 between each disc 33, 34 and the loops 14 or other middle part 22, 27 of the springs 5, 20, 25 may be varied. An alternative to different axial protrusions 35 of the teeth 4 of each disc 33, 34 at the outer and inner sides of it is to design each spring 5, 20, 25, 44 differently on its both sides to create different axial play at the different sides of the discs.

Preferably the different parts of the brake are standardised in as far extent as possible. Thus, all springs 5, 20, 25, 39, 44, 51, 54, 56 are identical and also the brake discs 2, 30, 33, 34, 60 are identical, but may be turned differently to give different plays, as indicated above.

Figure 14A:
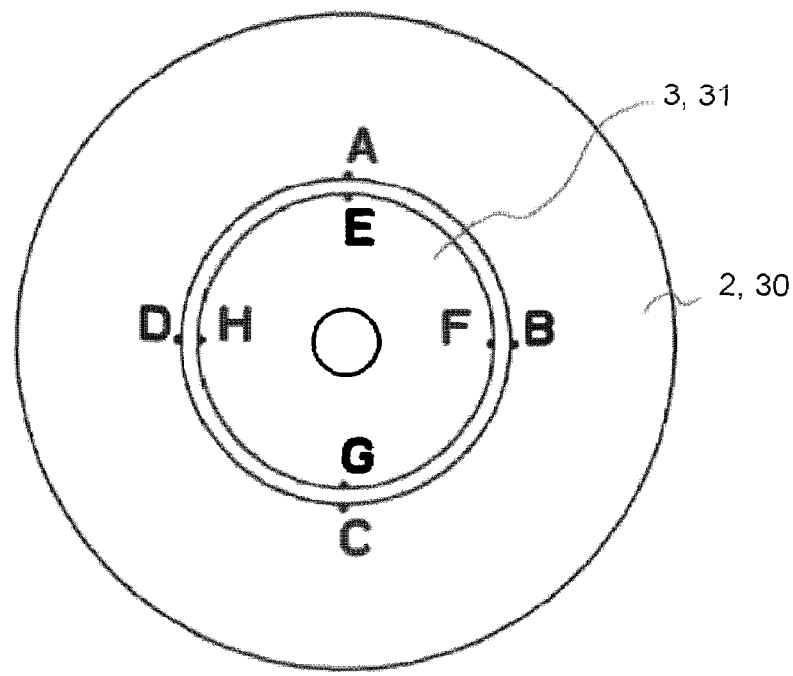
FIGS. 14a and 14b are schematic side views to illustrate direction of displacements depending on disc stabilizing element position.
Figure 14B:
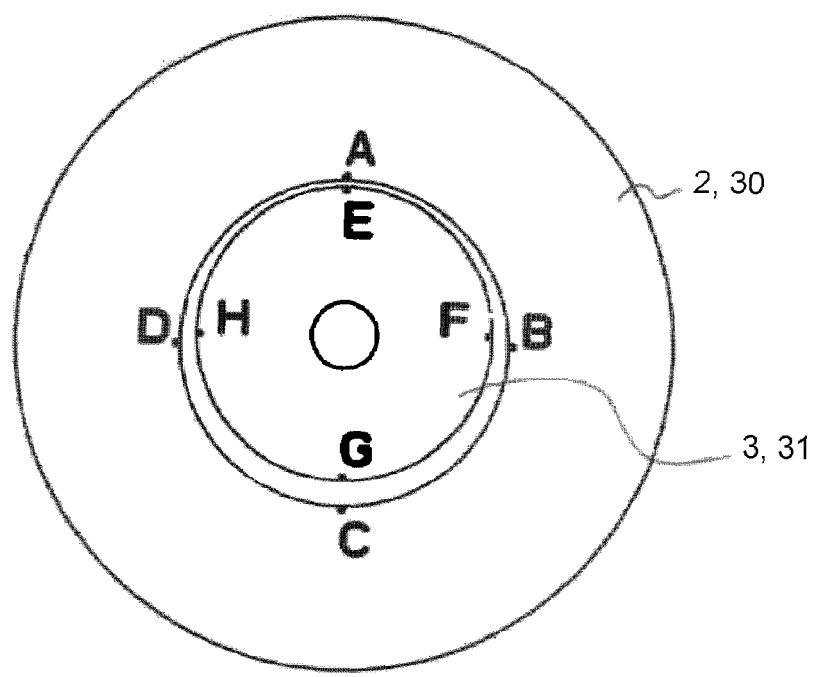

When the vehicle is driven on uneven ground or hits an object, such as a pavement, the jerks (i.e. vibrations) going through the vehicle may result in noise created in the brake. The disc 2, 30, 33, 34, 60 attaining a rotational or radial translation may create the noise. To counteract such noise the springs 5, 20, 25, 39, 44, 51, 54, 56 should be able to prevent these movements by producing radial, axial and/or tangential reaction forces. Preferably the springs should be designed to produce significant tangential acting reaction forces. Depending on the actual position of each spring 5, 20, 25, 39, 44, 51, 54, 56 said springs 5, 20, 25, 39, 44, 51, 54, 56 will be exposed to radial or tangential deformation, or a combination of these. In FIGS. 14a and 14b the movement of the disc 2, 30 in relation to the hub 3, 31 is shown schematically. The letters A to H represent contact points between each spring 5, 20, 25, 39, 44, 51, 54, 56 and the brake disc 2, 30 and the hub 3, 31, respectively. If for example a disc 2, 30 moves vertically, springs 5, 20, 25, 39, 44, 51, 54, 56 placed at the top AE and bottom GC of the disc 2, 30 will be exposed to radial deformation, while springs 5, 20, 25, 39, 44, 51, 54, 56 placed to the left DH and right BF will be exposed to tangential deformation. The springs 5, 20, 25, 39, 44, 51, 54, 56 are designed to be relatively stiff in tangential direction, and thus prevent the disc 2, 30 from rotating, or from translating radially, in relation to the hub 3, 31. The tangential stiffness of the springs 5, 20, 25, 39, 44, 51, 54, 56 is beneficial irrespectively of the direction of movement for the disc 2, 30. The tangential stiffness should be large enough to prevent bouncing contacts between the contact surfaces of the splines 4 or teeth on the hub 3, 31 and the disc 2, 30, respectively. This is achieved by designing the springs 5, 20, 25, 39, 44, 51, 54, 56 so as to be less susceptible to tangential forces than to radial or axial forces, giving bending moment. To achieve this, the maximal length of the levers by which the contact forces may act in bending direction on each spring 5, 20, 25, 39, 44, 51, 54, 56 is shorter for tangential forces 16 than for radial or axial forces 17, 18. The tangential 16 forces are schematically shown in FIG. 7a.

Figure 15A:
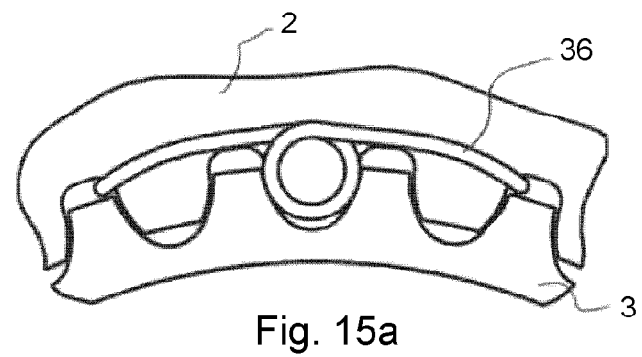
FIGS. 15a to 15c schematically illustrate means to counteract generation of noise under certain conditions.
Figure 15B:
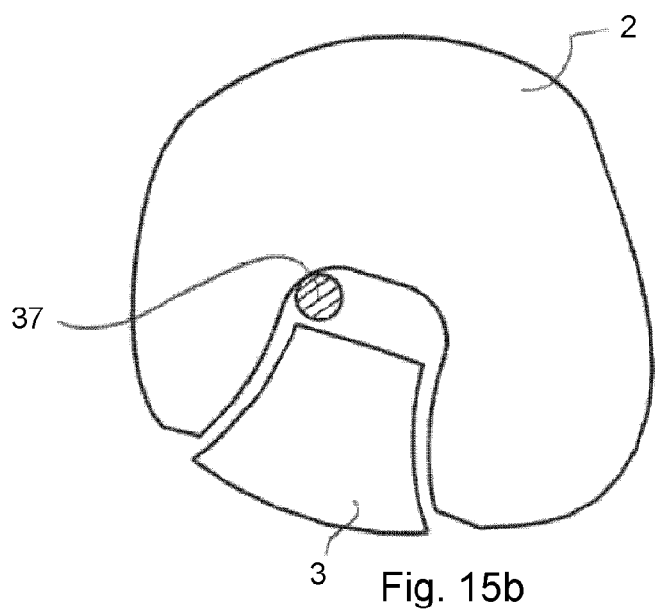
Figure 15C:
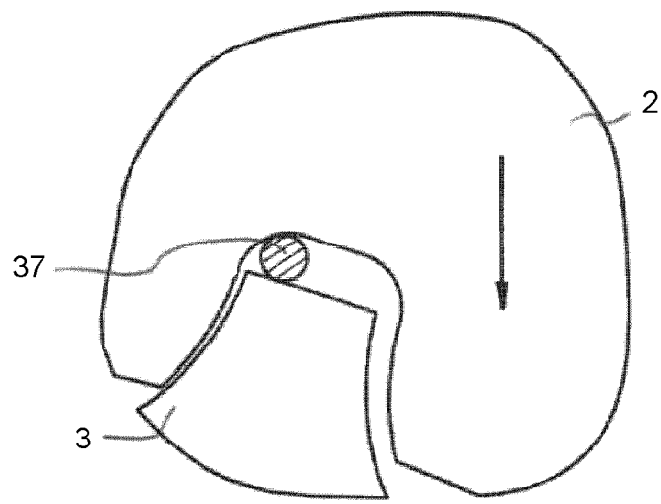

Another way to prevent bouncing contacts in the splined connection, and by that prevent noise, is to design the springs 5, 20, 25, 39, discs 2, 30, 33, 34 and the hub 3, 31 to create reaction forces on the short ends 13, of each spring 5, 20, 25, 39. Said reaction forces counteract the radial unwanted translations of the discs 2, 30, 33, 34. The reaction forces may be achieved by appropriate geometry of the areas where the disc 2, 30, 33, 34 and hub 3, 31 make contact with the short ends 13, 41 of the spring 5, 20, 25, 39. The geometry being such that the spring 5, 20, 25, 39 is jammed between the disc 2, 30, 33, 34 and the hub 3, 31 at radial displacements of the disc 2, 30, 33, 34, and by that forced to slide under development of friction forces. This is further explained by FIG. 15 and may be used in combination with a spring design aiming at noise suppression by tangential forces as described above. In FIG. 15a a spring 36 is shown placed between a brake disc 2 and a hub 3 in the same way as described above. In FIG. 15b the short side of the spring between the disc and the hub 3 is shown as a cross section of the spring wire 37 in a not displaced relative position. In FIG. 15c it is shown that the spring wire 37 becomes jammed between the disc 2 and the hub 3 when the disc 2 is radially displaced in relation to the hub 3.

Figure 18:
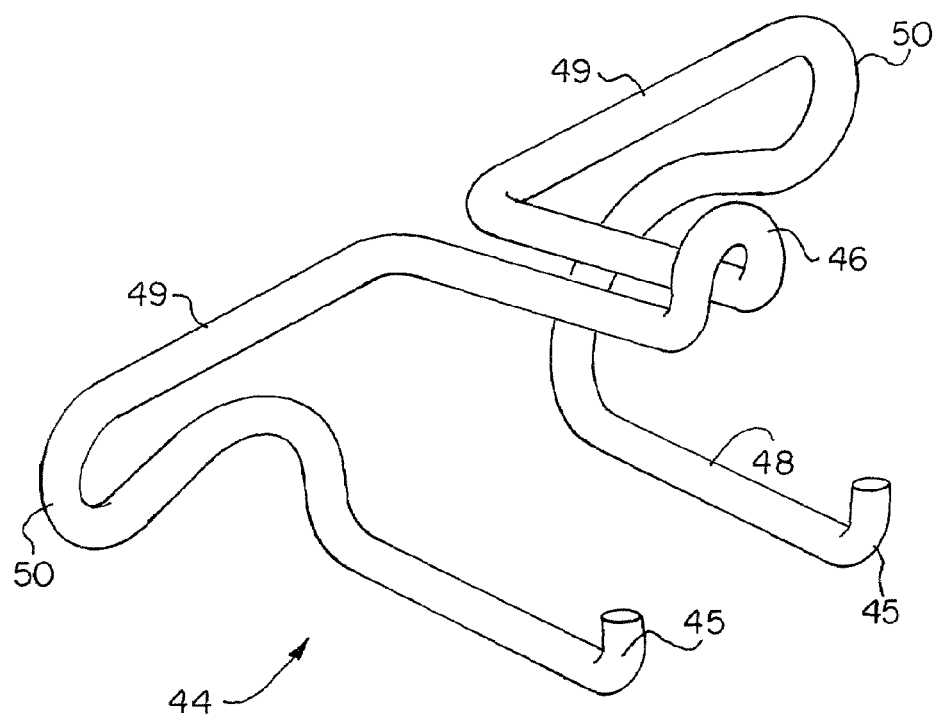
FIG. 18 is a perspective view of a disc stabilizing element in another embodiment according to the invention.
Figure 19:
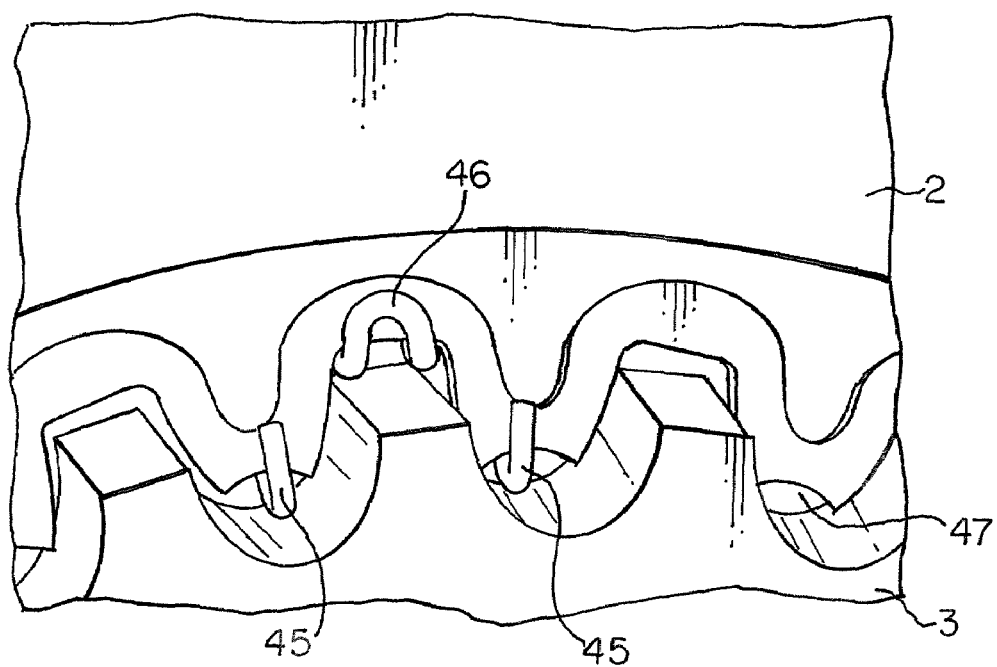
FIG. 19 is a perspective view of the disc stabilizing element in its mounted condition being placed between a brake disc and a hub.
Figure 20:
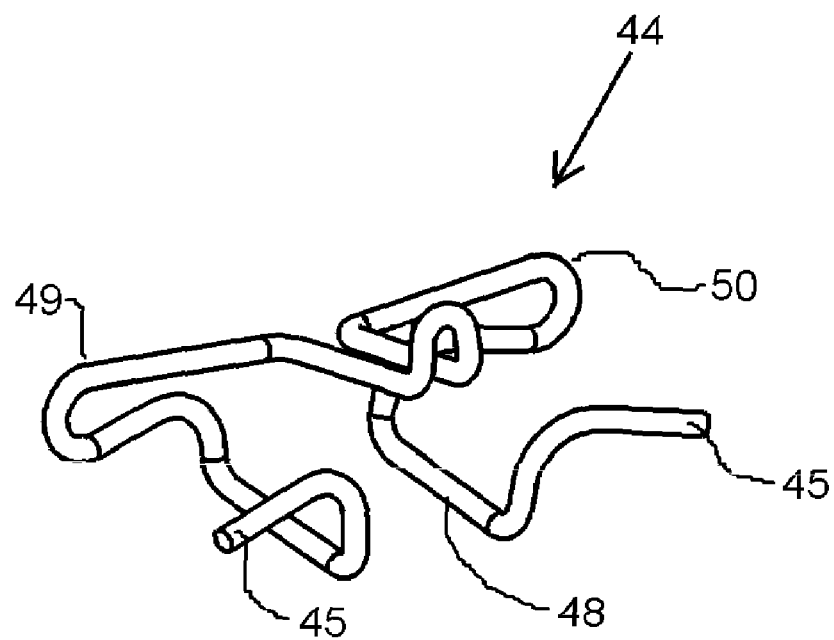
FIG. 20 is a perspective view of a disc stabilizing element in an embodiment similar to the one of FIG. 18.
Figure 23A:
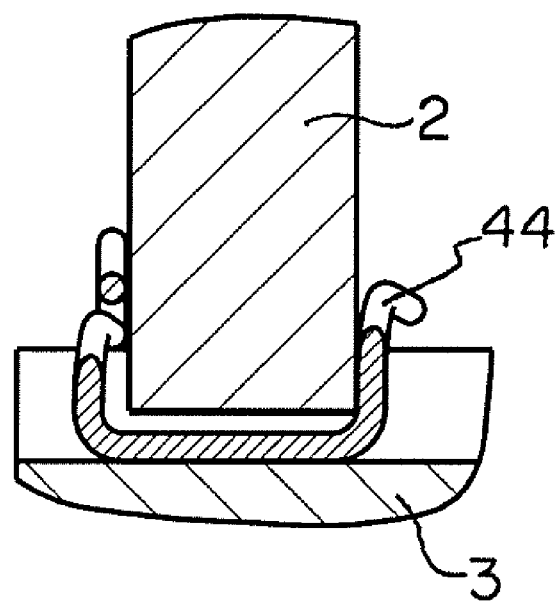
Figure 23B:
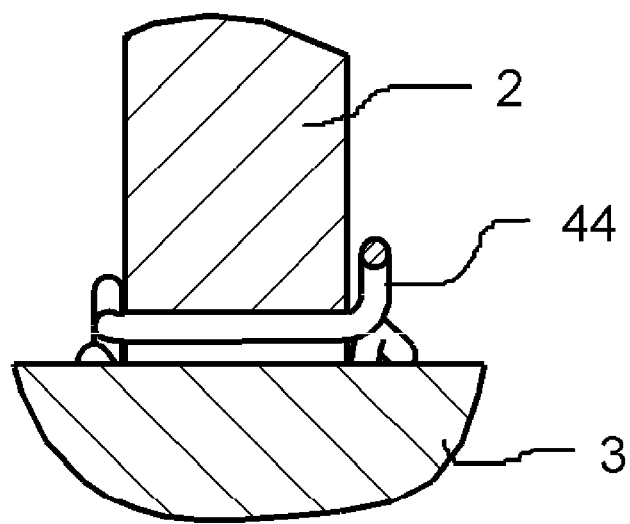

In FIGS. 18 and 20 another embodiment of a disc stabilizing element 44 is shown. The disc stabilizing element 44 is made of a spring wire, which has two lower free ends 45 and on upper bent end 46. In the embodiment of FIG. 18 the two lower free ends 45 are designed to engage with two adjacent teeth 4 of the brake disc, as can be seen in FIG. 19. For that reason the teeth 4 of the brake disc 2 are configured so as to comprise an axially extending groove 47, which receives axial extensions 48 of the spring 44, as can be better seen in the cross sections of FIGS. 23a and 23b.

On the side opposite of the free ends 45 and the bent end 46, the spring 44 comprises two long sides 49 which form a bent loop 50 on both sides and opposed to each other.

Figure 21A:
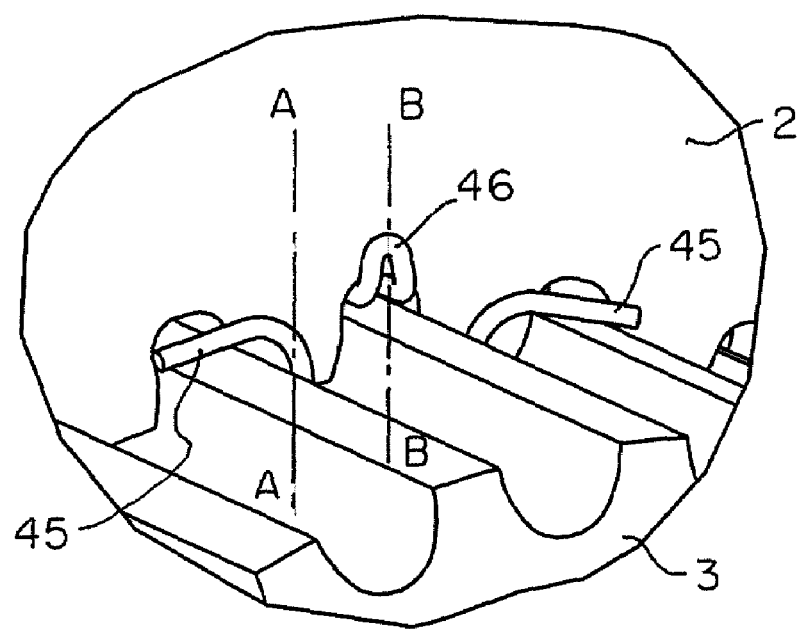
FIGS. 21a and 21b are perspective views of the disc stabilizing element of FIG. 20 in its mounted condition being placed between a brake disc and a hub on both sides of the brake disc, respectively.

The spring 44 in FIG. 20 differs from the spring 44 in FIG. 18 only by the shape of the free ends 45, which are further elongated and bent so as to straddle the top faces of the teeth 4 of the hub 3, as can be seen in FIG. 21a.

Also from this FIG. 21a, it can be seen that, whereas the free ends 45 engage with two adjacent splines 4 of the brake disc 2, the upper bent end 46 is engaging with the base between said two adjacent splines 4 of said brake disc 2.

Figure 21B:
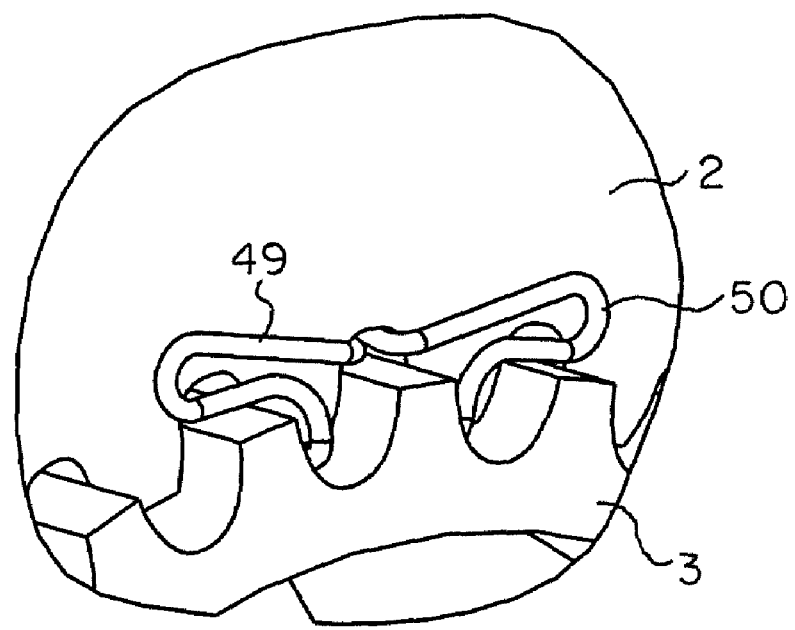
Figure 22:
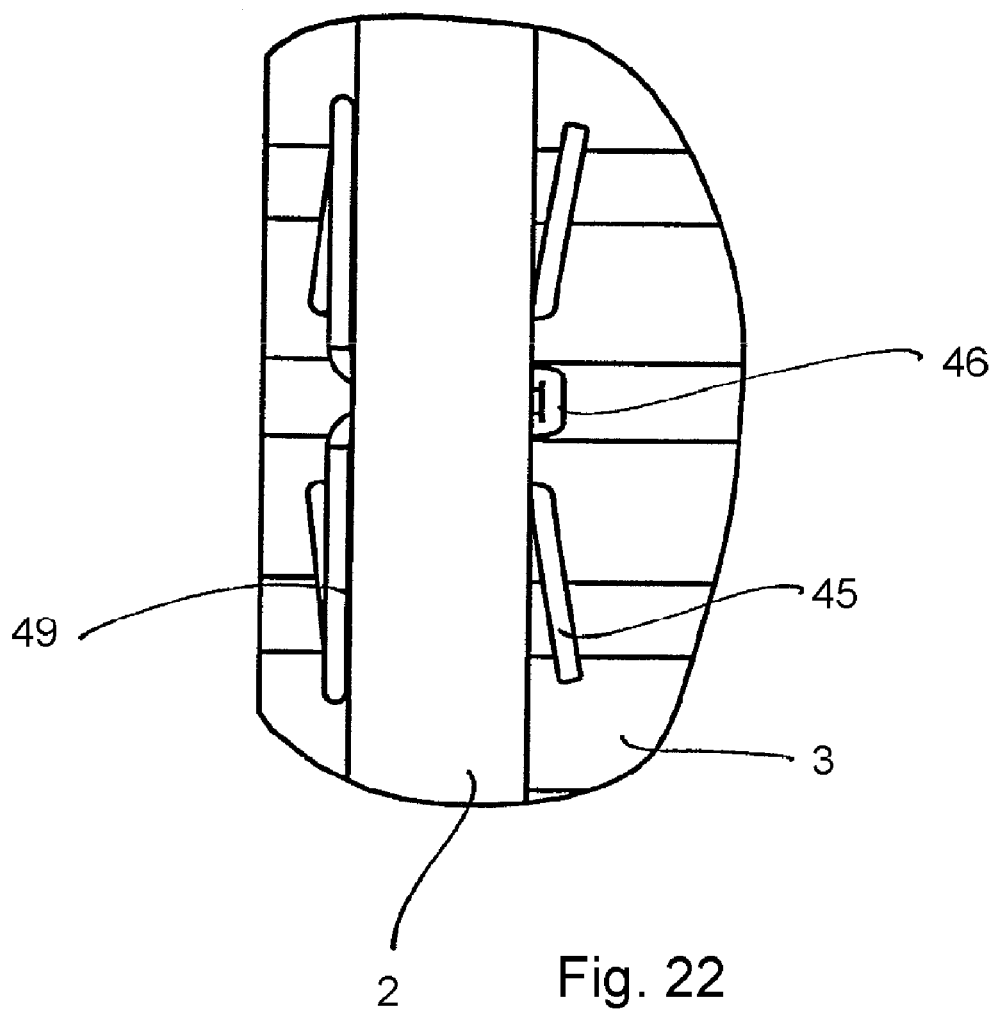
FIG. 22 is a top view of the disc stabilizing element of FIG. 20.

The two long sides 49 and their bent loops 50 are thereby then arranged at the opposite side of the brake disc 2, which is illustrated in FIG. 21b. Seen from the top, as in FIG. 22, it becomes apparent that by said specific spring design of the disc stabilizing element 44, by which the spring abuts against both sides of the brake disc 2, also axial retraction forces will be provided, as described above in connection with the other spring designs.

As can be especially seen in FIG. 19, the spring 44 enables that the clearance, i.e. air gaps between the brake disc 2 and the hub 3 will substantially be kept equal, which avoids points of contact via which heat which is generated during braking will be conducted to the hub 3 and further to the bearings (not shown) of the hub 3. In particular, the distances between the faces of the splines 4 of the brake disc 2 and the faces of the splines 4 of the hub 3 on both sides of the splines 4 are kept equal in the release condition.

Basically, all afore-mentioned spring designs of the disc stabilizing elements are configured so as to evenly distribute the clearance between splines 4 of both the brake disc 2 and the hub 3 or the part connected to the hub 3 in order to reduce thermal conductivity in the release condition of the brake.

Figure 27:
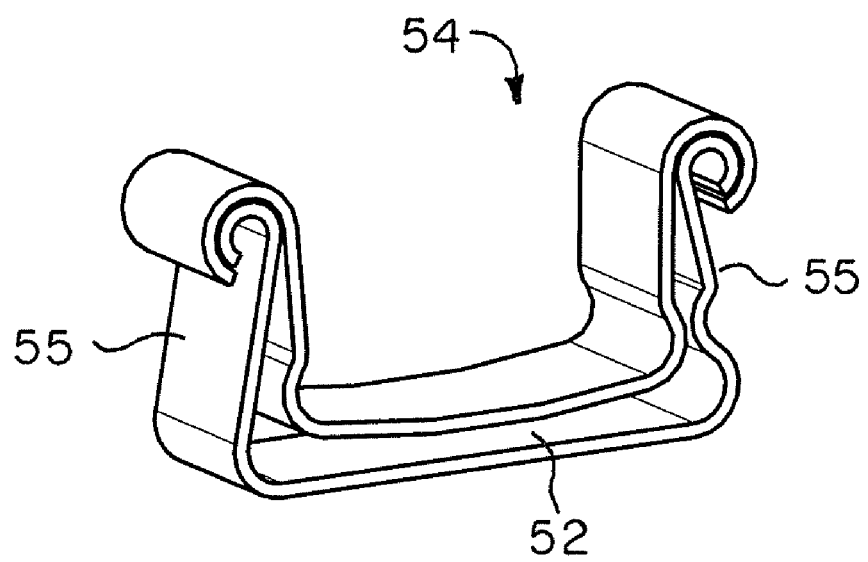
FIG. 27 is a perspective view of yet another disc stabilizing element according to the invention.
Figure 28:
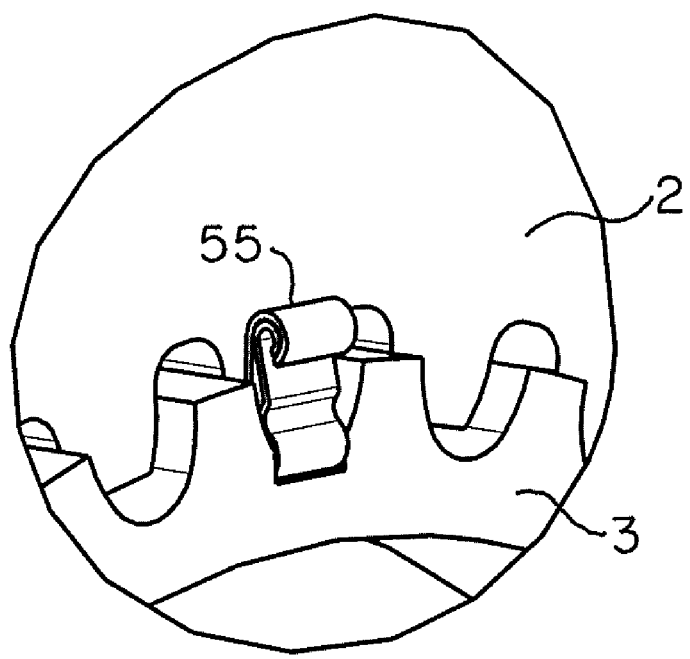
FIG. 28 is a perspective view showing the disc stabilizing element of FIG. 27 in its mounted condition being placed between a brake disc and a hub.

Other embodiments of a disc stabilizing element which fulfil the functionalities described above are shown in FIGS. 25 and 27.

The disc stabilizing elements basically consist of a metal sheet which is formed to a "U".

Figure 25:
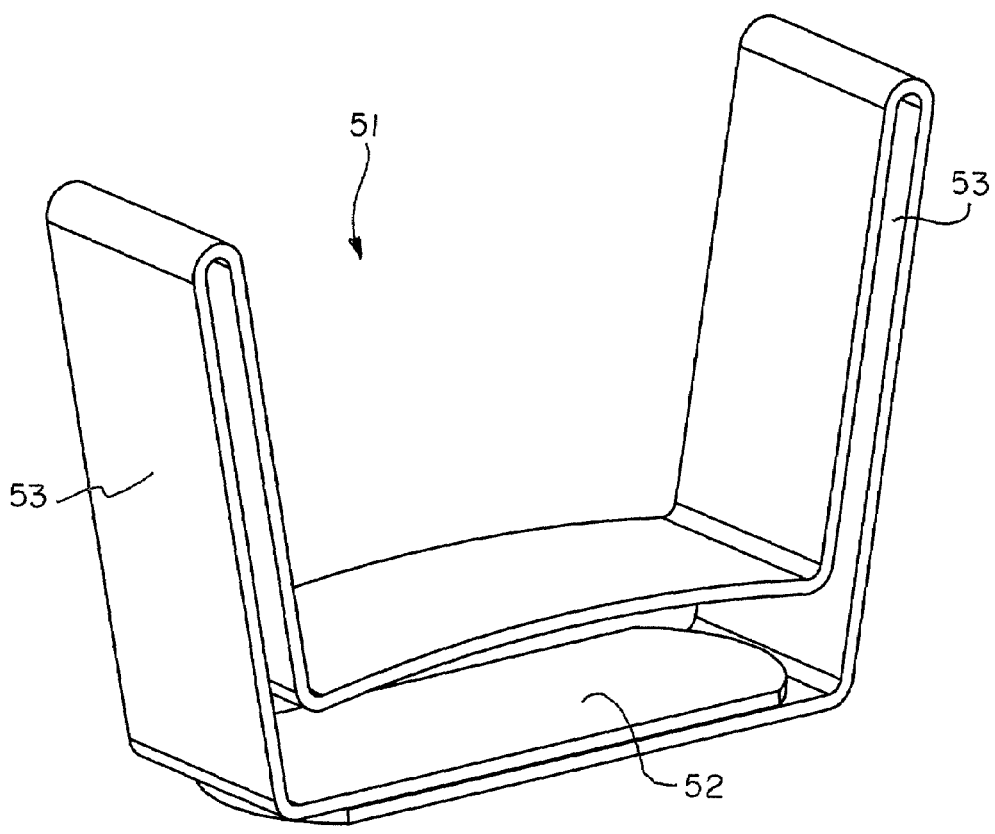
FIG. 25 is a perspective view of another disc stabilizing element according to the invention.
Figure 26:
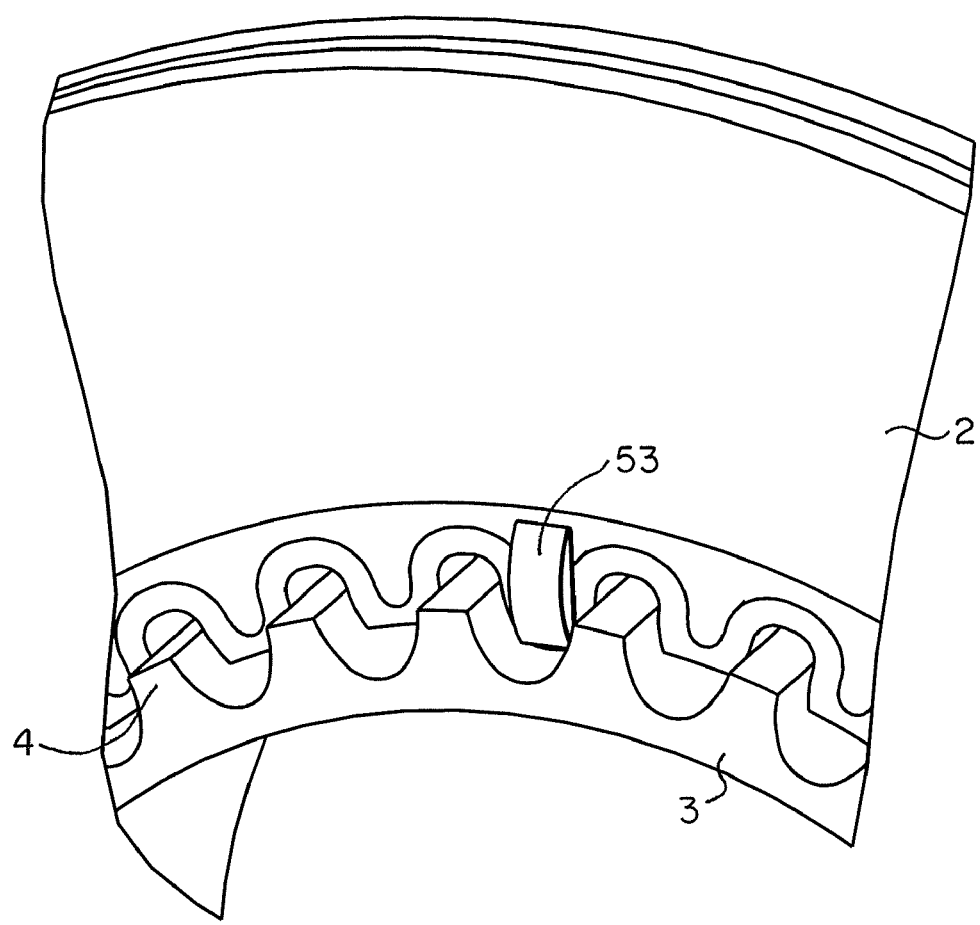
FIG. 26 is a perspective view showing the disc stabilizing element of FIG. 25 in its mounted condition being placed between a brake disc and a hub.

In FIG. 25 the disc stabilizing element 51 consists of one metal plate which is fixed at a base 52 of the U-shape thereby forming a double-walled spring mechanism. Two legs 53 are bent on both sides of it. As can be seen in FIG. 26, the legs 53 are deformed when the disc stabilizing element 51 is placed between the brake disc 2 and the hub 3, whereby the element 51 is embedding a spline 4 of the brake disc 2, so that one leg 53 is placed on one side of the brake disc 2, respectively. By that, the disc stabilizing element 51 is able to exert an axial retraction force on the brake disc 2 at release of the brake.

FIGS. 27 to 30 show a differing design of such an U-shaped disc stabilizing element. The disc stabilizing element 54 shown therein consists of two metal plates which are fixed on both ends of it at the top of legs 55, which is additionally formed as an open loop. The fixation between the metal sheets can be pressed, glued, soldered or welded.

Figure 29:
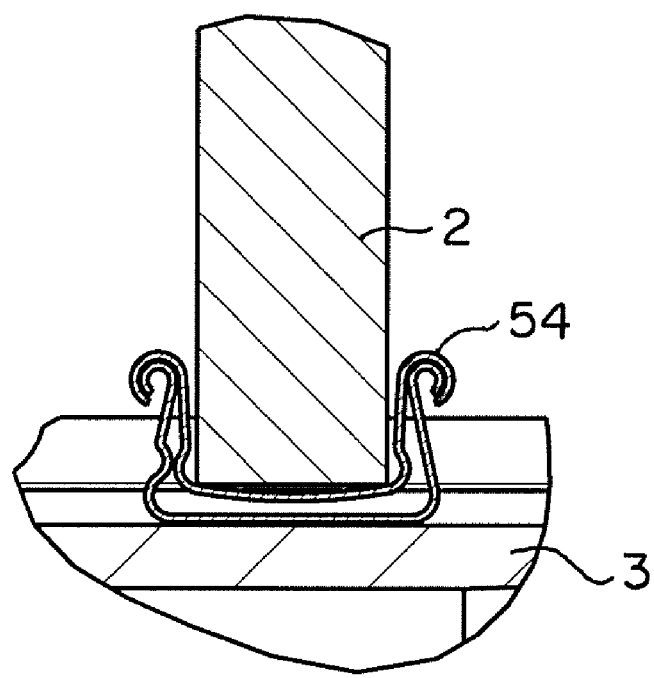
FIG. 29 is a sectional view of the disc stabilizing element of FIG. 28.
Figure 30:
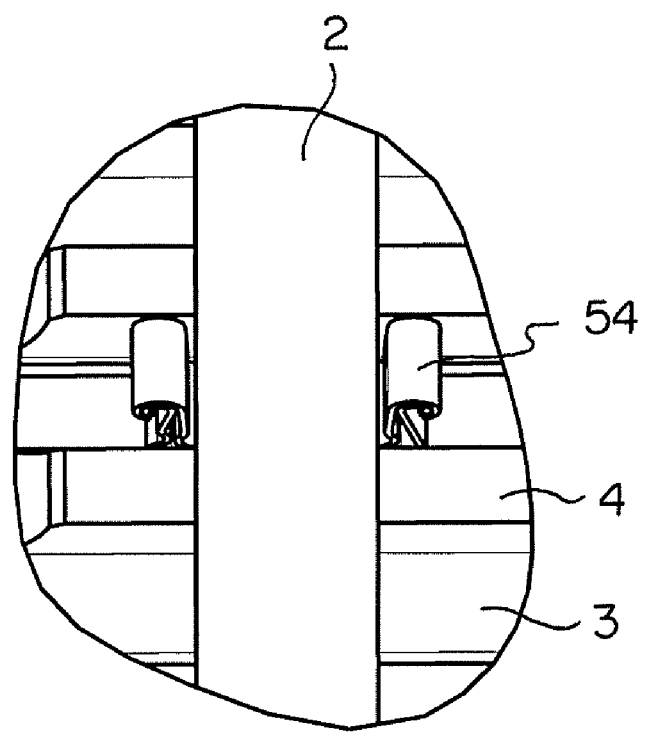
FIG. 30 is a top view of the disc stabilizing element of FIG. 28.
Figure 31:
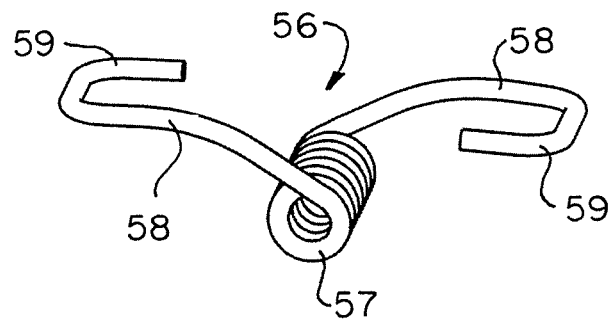
FIG. 31 is a perspective view of another disc stabilizing element according to the invention.

From the cross-section of FIG. 29, it becomes apparent that the design of the U-shaped disc stabilizing element 54 is able to exert radial forces as well as axial forces thereby preventing noise generation due to rattling while still exerting axial retraction upon deformation. In addition, also these U-shaped embodiments provide for an even distribution of the air gap between the splines 4 of both the brake disc 2 and the hub 3 or the part connected to the hub 3.

In FIGS. 31 to 33b another embodiment of a disc stabilizing element 56 of the type made of one single spring wire is illustrated.

In its middle section the disc stabilizing element 56 is formed like a helical spring 57. The spring wire of said helical spring 57 is extending at both ends of the helical spring 57 radially to a brake disc 60, namely in such way that these ends 58 are extending in opposite directions. At their ends, each extension 58 is formed to a bracket 59. These brackets 59 do face each other.

Figure 32:
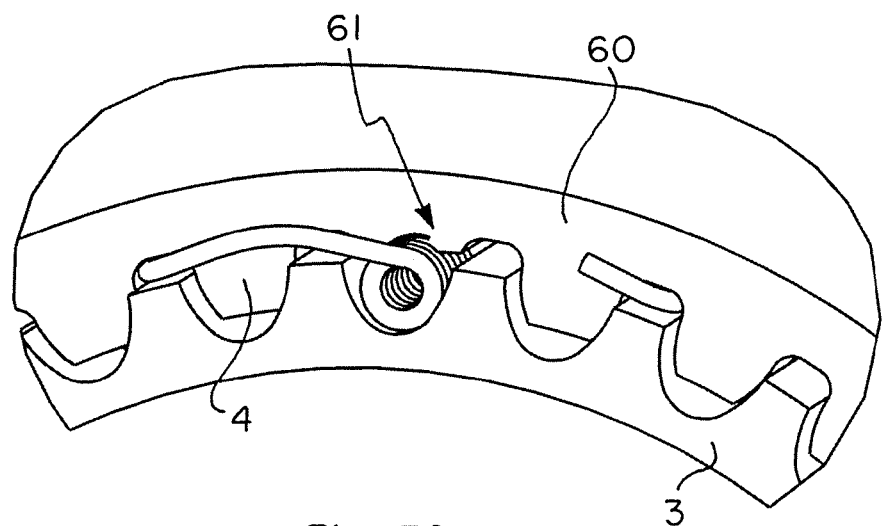
FIG. 32 is a perspective view showing the disc stabilizing element of FIG. 31 in its mounted condition being placed between a brake disc and a hub.

As can be seen from the illustration of FIG. 32, the disc stabilizing element 56 will be assembled between the brake disc 60 and the hub 3 in such a way so that the helical spring 57 is extending in the axial direction of the brake disc 60, whereby the helical spring 57 is received in a gap 61 which is provided in the series of splines 4 of the brake disc 60 for that purpose. The brackets 59 thereby clamp splines 4 which do embed said gap 61.

Figure 33A:
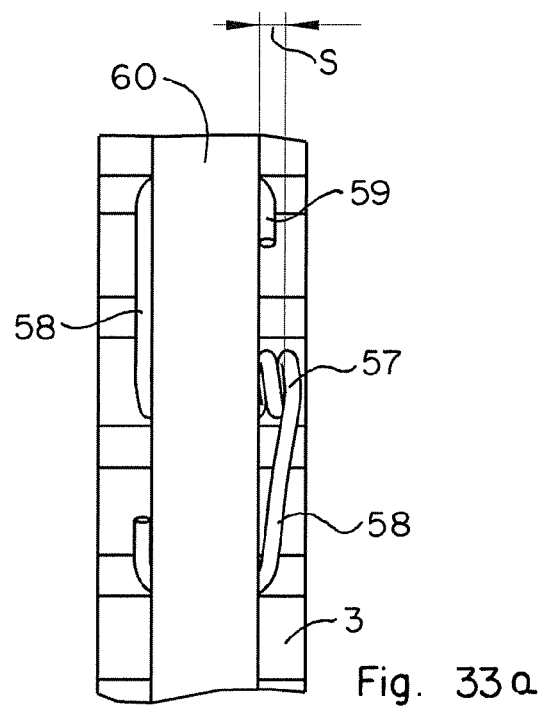
FIGS. 33a and 33b are plan views illustrating the movements of the disc and the disc stabilizing element in released and applied conditions, respectively.
Figure 33B:
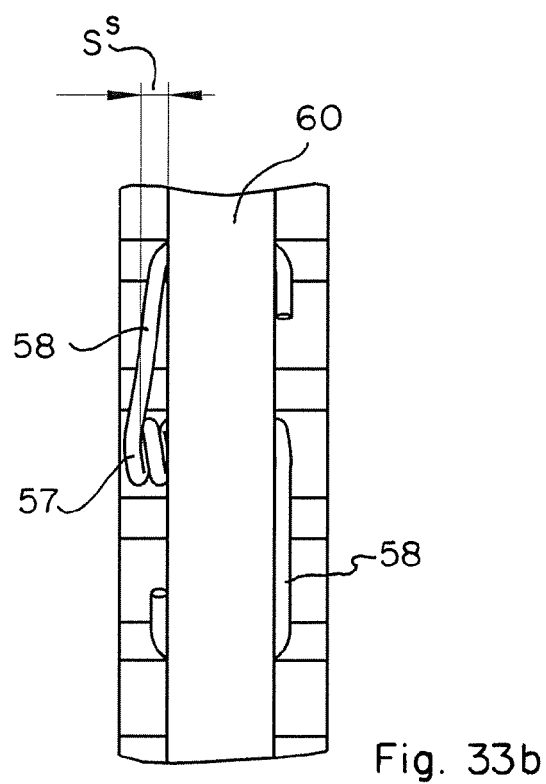

FIGS. 33a and 33b give an example of the situation of a released brake (FIG. 33a) and an applied brake (FIG. 33b), whereby the (not shown) brake actuating mechanism is placed to the left of the brake disc 60.

In FIG. 33a it can be seen that the spring 56 is arranged so as to keep a distance s between the end of the helical spring 57 and the brake disc 60 on the side opposite of the brake actuating mechanism. For ease of understanding, this distance s is exaggerated. When actuating occurs, the brake disc 60 is moving to the right, thereby deforming the spring 56 so that it is axially deflected on its other side for the same distance s. At release of the brake, the spring 56 then is exerting an axial retraction force on the brake disc 60 due to the frictional engagement between the helical spring 57 and the hub 3. The axial deflection s thus corresponds to the retraction distance.

A person skilled in the art realizes that the exact form of the springs may vary as long as they perform in the same or similar way as described above. Also, a person skilled in the art will realize, that although the invention mainly was referring to disc brakes having sliding discs, the different embodiments of the disc stabilizing elements can be also used in disc brakes having fixed brake discs, in order to reduce the thermal conduction between the brake disc fixed on the hub or the part connected to the hub and said hub or said part.

What is claimed is:

1. A disc brake having a caliper receiving one or more brake pads and encircling one or more brake discs, of which at least one brake disc is received slideably on a hub or a part connected to the hub, by means of splines or teeth, which hub is received on a wheel axle, and which one or more brake pads are parts of brake pad assemblies, wherein two or more disc stabilizing elements are placed between each brake disc and the hub or the part connected to the hub, characterized in that the disc stabilizing elements are configured and arranged such as to deflect in axial direction during application of the brake and create forces assisting the axial retraction of the brake discs at release of the brake.

2. The disc brake of claim 1, characterized in that the disc stabilizing elements are springs acting between each disc and the hub or the part connected to the hub and that to give the axial deflection of the springs the axial sliding of each spring on the hub or the part connected to the hub during actuation of the brake is restricted by axial friction forces established in the points of contacts between the hub or the part connected to the hub and the spring.

3. The disc brake of claims 2, characterized in that the springs have a generally rectangular form in plan view, with two long sides and two short sides and that the short sides of each spring are received in teeth or spline gaps in the brake disc.

4. The disc brake of claim 3, characterized in that a loop and/or semicircular, curved parts are formed in each long side and that the loops and/or the semicircular, curved parts of the springs after assembly are placed adjacent a tooth or spline of the disc and are received in teeth or spline gaps of the hub or the part connected to the hub.

5. The disc brake of claim 4, characterized in that each loop and/or curved parts is/are placed approximately in the middle of each long side and/or that curved parts are formed at both ends of each long side, adjacent the short sides of the spring.

6. The disc brake of claim 3, characterized in that reaction forces are created in radial direction between the short sides or cross bars of each spring and an inner circumference of the disc in contact with said short sides or cross bars at radial displacement of the disc.

7. The disc brake of claim 3, characterized in that the spring has bent parts on each long side, which bent parts clamp a tooth or spline of the hub or the part connected to the hub after assembly.

8. The disc brake of claim 2, characterized in that the spring is having two lower free ends, which lower free ends do engage with a top of two adjacent splines or teeth of the brake disc, and one bent upper end, which upper end does engage with a base between said two adjacent splines or teeth of the brake disc.

9. The disc brake of claim 8, characterized in that the two lower free ends are further elongated so as to be bent over the top of splines or teeth of the hub or the part connected to the hub, which are adjacent to the splines or teeth of the brake disc with the top of which the two lower free ends do engage.

10. The disc brake of claim 8, characterized in that the two lower free ends and the one bent upper end are arranged on the same side of the brake disc.

11. The disc brake of claim 2, characterized in that the spring is made of metal sheet, the sheet being configured substantially as a U-shaped double wall loop element having two legs which are connected by a base, the base being arranged between the top of one spline or tooth of the brake disc and a base of two splines or teeth of the hub or the part connected to the hub.

12. The disc brake of claim 11, characterized in that the legs are shaped and configured such so as to be deflectable in axial direction.

13. The disc brake of claim 2, characterized in that friction forces in axial direction are enlarged by arranging the spring to elastically clamp one or more splines or teeth on the hub or the part connected to the hub.

14. The disc brake of claim 2, characterized in that the spring is comprising a helical spring, both ends of which do extend radially from the helical spring into opposite directions and end in brackets, and in that the brake disc is configured to comprise gaps in its circumferential series of splines or teeth, in which the helical spring is received in a way so as to extend to both sides of said brake disc, whereby the brackets do clamp the splines or teeth of the brake disc which are placed at both sides of the gaps, respectively.

15. The disc brake of claim 2, characterized in that the springs are made of spring wire.

16. The disc brake of claim 2, characterized in that the springs are made of metal sheet. directions.

17. The disc brake of claim 2, characterized in that supports are arranged on the disc in the areas receiving the springs, which supports are positioned to abut the springs.

18. The disc brake of claim 2, characterized in that the springs have a larger stiffness against forces in the tangential direction than in the axial or radial directions.

19. The disc brake of claim 1, characterized in that at least two disc stabilizing elements are arranged between the brake disc and the hub or the part connected to the hub in such a way so as to rotationally center the brake disc on the hub or the part connected to the hub thereby keeping a uniform clearance between the brake disc and the hub or the part connected to the hub.

20. The disc brake of claim 19, characterized in that the clearance is at least 0.4 mm.

21. The disc brake of claim 20, characterized in that the clearance is at least 0.6 mm.

22. The disc brake of claim 21, characterized in that the clearance is at least 0.8 mm.

23. The disc brake of claim 19, characterized in that the disc stabilizing elements are arranged in such a way so as to keep an equal distance between the faces of the splines or the teeth of the brake disc and the faces of the splines or the teeth of the hub or the part connected to the hub.

24. The disc brake of claim 1, characterized in that for brakes having two or more brake discs the axial deflection of the disc stabilizing elements differs between the brake discs, to assist the axial separation of the discs from their intermediate brake pad at release of the brake.

25. The disc brake of claim 24, characterized in that the different axial deflection is given by different axial plays between the disc and the springs depending on the placement of the discs.

26. The disc brake of claim 25, characterized in that the splines or teeth have axial protrusions, which vary between the discs, or between the left and right side of the disc.

27. The disc brake of claim 25, characterized in that the springs have axial protrusions, which vary between the discs, or between the left and right side of the discs.

28. The disc brake of claim 1, characterized in that the disc stabilizing elements are held at the brake discs by means that are removed after assembly of the brake.

29. The disc brake of claim 28, characterized in that the removable means holding the disc stabilizing elements at each brake disc before assembly are lashing wires or are wires having hooks at each end, which hooks do engage with the disc stabilizing elements.

30. The disc brake of claim 1, characterized in that the friction forces are magnified by arranging wedge-shaped contacts between the springs and the hub or the part connected to the hub.

31. The disc brake of claim 30, characterized in that the wedge-shaped contacts are achieved by utilising inclined faces of the splines or teeth.

32. The disc brake of claim 30, characterized in that the wedge-shaped contacts are achieved by a wedge-shape of the spring itself.

33. The disc brake of claim 1, characterized in that the disc stabilizing elements axially frictionally engage the hub or the part connected to the hub and are configured so as to deflect in axial direction but remain axially stationary on the hub or the part connected to the hub when axial forces insufficient to overcome the axial frictional engagement between the disc stabilizing elements and the hub or the part connected to the hub are applied, and to deflect in axial direction and also slide axially on the hub or the part connected to the hub when axial forces sufficient to overcome the axial frictional engagement between the disc stabilizing elements and the hub or the part connected to the hub are applied.

34. The disc brake of claim 1, characterized in that the disc stabilizing elements create elastic forces in radial direction.

35. The disc brake of claim 1, characterized in that different types of disc stabilizing elements are arranged between one brake disc and the hub or the part connected to the hub.

36. The disc brake of claim 1, characterized in that for brakes having two or more brake discs the type of disc stabilizing elements arranged between one of the two or more brake discs and the hub or the part connected to the hub and arranged between another of the two or more brake discs and the hub or the part connected to the hub is different.

* * * * *